(12) United States Patent
Jeon et al.

(10) Patent No.: US 8,698,144 B2
(45) Date of Patent: *Apr. 15, 2014

(54) DISPLAY DEVICE WITH IMPROVED SENSING MECHANISM

(75) Inventors: Kyung-Sook Jeon, Yongin-si (KR);
Kap-Soo Yoon, Seoul (KR);
Woong-Kwon Kim, Cheonan-si (KR);
Sang-Youn Han, Cheonan-si (KR);
Jun-Ho Song, Seongnam-si (KR);
Sung-Hoon Yang, Seoul (KR);
Byeong-Hoon Cho, Seoul (KR);
Dae-Cheol Kim, Suwon-si (KR);
Ki-Hun Jeong, Cheongan-si (KR);
Jung-Suk Bang, Guri-si (KR)

(73) Assignee: Samsung Display Co., Ltd. (KR)

( * ) Notice: Subject to any disclaimer, the term of this patent is extended or adjusted under 35 U.S.C. 154(b) by 1004 days.

This patent is subject to a terminal disclaimer.

(21) Appl. No.: 12/731,380

(22) Filed: Mar. 25, 2010

(65) Prior Publication Data

US 2011/0012115 A1 Jan. 20, 2011

(30) Foreign Application Priority Data

Jul. 17, 2009 (KR) ........................ 10-2009-0065609

(51) Int. Cl.
*H01L 33/00* (2010.01)

(52) U.S. Cl.
USPC ................. 257/59; 257/E33.053; 257/E33.06

(58) Field of Classification Search
USPC ................................ 257/59, E33.053, E33.06
See application file for complete search history.

(56) References Cited

U.S. PATENT DOCUMENTS 8,174,015 B2 * 5/2012 Jeong et al. ..................... 257/59

FOREIGN PATENT DOCUMENTS

| JP | 05-175538 | 7/1993 |
| --- | --- | --- |
| JP | 10-256158 | 9/1998 |
| JP | 2001-086293 | 3/2001 |
| JP | 2004-335824 | 11/2004 |
| JP | 2006-351616 | 12/2006 |
| JP | 2007-052102 | 3/2007 |
| JP | 2008-096399 | 4/2008 |
| JP | 2009-048145 | 3/2009 |
| KR | 10-2000-0038298 | 7/2000 |
| KR | 10-2003-0058719 | 7/2003 |
| KR | 10-2003-0058720 | 7/2003 |
| KR | 10-2003-0069342 | 8/2003 |
| KR | 10-2005-0065304 | 6/2005 |
| KR | 10-2005-0103293 | 10/2005 |
| KR | 10-2006-0054820 | 5/2006 |

(Continued)

*Primary Examiner* — Matthew W Such
*Assistant Examiner* — Monica D Harrison
(74) *Attorney, Agent, or Firm* — Innovation Counsel LLP

(57) ABSTRACT

A display panel that includes: a substrate, a sensing transistor disposed on the substrate, and a readout transistor connected to the sensing transistor and transmitting a detecting signal is presented. The sensing transistor includes a semiconductor layer disposed on the upper substrate, a source electrode and a drain electrode disposed on the semiconductor layer, and a gate electrode overlapping the semiconductor layer on the source electrode and the drain electrode. Accordingly, in a display device and a manufacturing method thereof, an infrared sensing transistor, a visible light sensing transistor, and a readout transistor are simultaneously formed with a top gate structure such that the number of manufacturing processes and the manufacturing cost may be reduced.

31 Claims, 23 Drawing Sheets

(56) References Cited

FOREIGN PATENT DOCUMENTS

| | | |
|---|---|---|
| KR | 10-2006-0132372 | 12/2006 |
| KR | 10-2007-0002280 | 1/2007 |
| KR | 10-2007-0017073 | 2/2007 |
| KR | 10-2007-0049405 | 5/2007 |
| KR | 10-2007-0106278 | 11/2007 |
| KR | 10-2008-0000768 | 1/2008 |
| KR | 10-2008-0028208 | 3/2008 |
| KR | 10-2008-0028270 | 3/2008 |
| KR | 10-2009-0005452 | 1/2009 |
| WO | 2005-119790 | 12/2005 |

* cited by examiner

_DISPLAY DEVICE WITH IMPROVED SENSING MECHANISM_

CROSS-REFERENCE TO RELATED APPLICATION

This application claims priority to and the benefit of Korean Patent Application No. 10-2009-0065609 filed in the Korean Intellectual Property Office on Jul. 17, 2009, the entire contents of which are incorporated herein by reference.

BACKGROUND OF THE INVENTION (a) Field of the Invention

The present invention relates to a display device and a manufacturing method thereof.

(b) Description of the Related Art

Currently, there are many types of flat panel displays being developed. Among them, liquid crystal display is widely used for many applications.

Recently, much research has been performed on developing a sensing device that can be used for a liquid crystal display having a touch sensing function or an image sensing function. Although conventional sensing devices are available, they do not always provide accurate results because they typically achieve the sensing function or the image sensing function by detecting physical changes.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a display device having improved sensing function reliability and a manufacturing method thereof.

In one aspect, the invention includes a display panel including a substrate, a sensing transistor disposed on the substrate, and a readout transistor connected to the sensing transistor and transmitting a detecting signal, wherein the sensing transistor includes a semiconductor layer disposed on the upper substrate, a source electrode and a drain electrode disposed on the semiconductor layer, and a gate electrode overlapping the semiconductor layer on the source electrode and the drain electrode.

The semiconductor layer of the sensing transistor may include at least one selected from amorphous silicon, amorphous silicon-germanium, and micro-crystalline silicon.

The semiconductor layer may be made of a single layer of amorphous silicon-germanium.

The semiconductor layer may include a lower layer of amorphous silicon and an upper layer of amorphous silicon-germanium.

The thickness of the lower layer may be more than 200 Å, and the thickness of the upper layer may be more than 1500 Å.

A channel passivation layer disposed on the semiconductor layer of the sensing transistor may be further included.

The sensing transistor may include an infrared sensing transistor, and a light blocking film is disposed between the upper substrate and the semiconductor layer of the infrared sensing transistor.

The light blocking film may be applied with a predetermined voltage.

In another aspect, the invention includes a display device that includes: a lower panel including a lower substrate and a pixel transistor disposed on the lower substrate; and an upper panel facing the lower panel and including an upper substrate, an infrared sensing transistor, a visible light sensing transistor, and a readout transistor, wherein the infrared sensing transistor includes a first semiconductor layer disposed on the upper substrate, a first source electrode and a first drain electrode disposed on the first semiconductor layer, and a first gate electrode overlapping the first semiconductor layer on the first source electrode and the first drain electrode, and the readout transistor is connected to the visible light sensing transistor and the infrared sensing transistor, thereby transmitting a detecting signal.

The visible light sensing transistor may include a second semiconductor layer disposed on the upper substrate, a second source electrode and a second drain electrode disposed on the second semiconductor layer, and a second gate electrode overlapping the second semiconductor layer on the second source electrode and the second drain electrode.

The second semiconductor layer includes a lower layer of amorphous silicon and an upper layer of amorphous silicon-germanium, and a portion of the upper layer of the second semiconductor layer may be removed between the second source electrode and the second drain electrode.

A channel passivation layer disposed on the first semiconductor layer and the second semiconductor layer may be further included.

The visible light sensing transistor may include a second source electrode and a second drain electrode disposed on the upper substrate, a second semiconductor layer disposed between the second source electrode and the second drain electrode, and a second gate electrode overlapping the second semiconductor layer on the second semiconductor layer.

The second gate electrode may have a plurality of openings.

The second semiconductor layer may include a lower layer of amorphous silicon and an upper layer of amorphous silicon-germanium, and a portion of the upper layer of the second semiconductor layer is removed between the second source electrode and the second drain electrode.

A channel passivation layer may be disposed on the first semiconductor layer and the second semiconductor layer.

The visible light sensing transistor may include a second source electrode and a second drain electrode disposed on the upper substrate, a second semiconductor layer disposed between the second source electrode and the second drain electrode, and a second gate electrode overlapping the second semiconductor layer on the second semiconductor layer.

The second semiconductor layer may include a lower layer of amorphous silicon and an upper layer of amorphous silicon-germanium, and a portion of the upper layer of the second semiconductor layer may be removed between the second source electrode and the second drain electrode.

A channel passivation layer may be disposed on the first semiconductor layer and the second semiconductor layer.

The visible light sensing transistor may include a second gate electrode disposed on the upper substrate, a second source electrode and a second drain electrode disposed on the second gate electrode, and a second semiconductor layer overlapping the second gate electrode on the second source electrode and the second drain electrode.

The second gate electrode has a plurality of openings.

The second semiconductor layer may include a lower layer of amorphous silicon and an upper layer of amorphous silicon-germanium, and a portion of the upper layer of the second semiconductor layer may be removed between the second source electrode and the second drain electrode.

A channel passivation layer may be disposed on the first semiconductor layer and the second semiconductor layer.

The readout transistor may include a second semiconductor layer disposed on the upper substrate, a second source electrode and a second drain electrode disposed on the second semiconductor layer, and a second gate electrode overlapping the second semiconductor layer on the second source electrode and the second drain electrode.

A light blocking film disposed between the upper substrate and the third semiconductor layer may be further included.

The readout transistor may include a second gate electrode disposed on the upper substrate, a second semiconductor layer disposed on the second gate electrode and overlapping the second gate electrode, and a second source electrode and a second drain electrode disposed on the second semiconductor layer.

A light blocking film disposed on the second source electrode and the second drain electrode and overlapping the second semiconductor layer may be further included.

The readout transistor may include a second source electrode and a second drain electrode disposed on the upper substrate, a second semiconductor layer disposed between the second source electrode and the second drain electrode, and a second gate electrode disposed on the second semiconductor layer and overlapping the second semiconductor layer.

A light blocking film disposed between the upper substrate and the second semiconductor layer may be further included.

The readout transistor may include a second gate electrode disposed on the upper substrate, a second source electrode and a second drain electrode disposed on the second gate electrode, and a second semiconductor layer disposed on the second source electrode and the second drain electrode and overlapping the second gate electrode.

A light blocking film disposed on the second semiconductor layer, and overlapping the second semiconductor layer may be further included.

A method for manufacturing a display device according to an exemplary embodiment of the present invention includes: forming a semiconductor structure on a substrate; etching the semiconductor structure to form a first semiconductor layer of a sensing transistor, and a second semiconductor layer of a readout transistor connected to the sensing transistor, thereby transmitting a detecting signal; forming a first source electrode and a first drain electrode on the substrate and the first semiconductor layer, and a second source electrode and a second drain electrode on the substrate and the second semiconductor layer; forming a gate insulating layer on the first source electrode and the first drain electrode, and on the second source electrode and the second drain electrode; and forming a first gate electrode overlapping the first semiconductor layer on the gate insulating layer, and a second gate electrode overlapping the second semiconductor layer on the gate insulating layer.

The method may further include forming a first light blocking film and a second light blocking film respectively overlapping the first semiconductor layer and the second semiconductor layer on the substrate; and forming a blocking insulating layer on the substrate, the first light blocking film, and the second light blocking film before forming the first and second semiconductor layers.

A manufacturing method according to a display device according to another exemplary embodiment of the present invention includes: forming a semiconductor structure and an insulating layer on a substrate; forming a photosensitive film pattern including a first portion and a second portion that is thinner than the first portion on the insulating layer; etching the semiconductor structure and the insulating layer by using the photosensitive film pattern to form a first semiconductor layer and a first channel passivation layer of a sensing transistor, and a second semiconductor layer and a second channel passivation layer of a readout transistor; sequentially forming an ohmic contact structure and a conductive layer on the substrate, the first and second semiconductor layers, and the first and second channel passivation layers; DeletedTextsetching the ohmic contact structure and the conductive layer to form first and second ohmic contact layers, a first source electrode, a first drain electrode, a second source electrode, and a second drain electrode; forming a gate insulating layer on the first source electrode, the first drain electrode, the second source electrode, and the second drain electrode; and forming a first gate electrode overlapping the first semiconductor layer on the gate insulating layer, and a second gate electrode overlapping the second semiconductor layer on the gate insulating layer.

The etching of the semiconductor structure and the insulating layer by using the photosensitive film pattern to form the first semiconductor layer and the first channel passivation layer of the sensing transistor, and the second semiconductor layer and the second channel passivation layer of the readout transistor, may include etching the insulating layer and the semiconductor structure by using the photosensitive film pattern as a mask to form the first semiconductor layer, back-etching the photosensitive film pattern to remove a second portion and expose the underlying insulating layer, and etching the exposed insulating layer to form the first channel passivation layer.

A manufacturing method of a display device according to another exemplary embodiment of the present invention includes: forming a semiconductor structure on a substrate; etching the semiconductor structure to form a first semiconductor layer of a sensing transistor and a second semiconductor layer of a readout transistor; respectively forming a first channel passivation layer and a second channel passivation layer on the first and second semiconductor layers; sequentially forming an ohmic contact structure and a conductive layer on the substrate, the first and second semiconductor layers, and the first and second channel passivation layers; etching the ohmic contact structure and the conductive layer to form first and second ohmic contact layers, a first source electrode, a first drain electrode, a second source electrode, and a second drain electrode; forming a gate insulating layer on the first source electrode and the first drain electrode, and the second source electrode and the second drain electrode; and forming a first gate electrode overlapping the first semiconductor layer on the gate insulating layer, and a second gate electrode overlapping the second semiconductor layer on the gate insulating layer.

A manufacturing method of a display device according to another exemplary embodiment of the present invention includes: forming a second gate electrode of a readout transistor on a substrate; forming a gate insulating layer on the second gate electrode; forming a first semiconductor layer of a visible light sensing transistor, a second semiconductor layer of an infrared ray transistor, and a second semiconductor layer of a readout transistor on the gate insulating layer; forming a first source electrode and a first drain electrode on the first semiconductor layer, a second source electrode and a second drain electrode on the second semiconductor layer, and a second source electrode and a second drain electrode on the second semiconductor layer; and forming a first gate electrode overlapping the first semiconductor layer on the first source electrode and the first drain electrode, and a second gate electrode overlapping the second semiconductor layer on the second source electrode and the second drain electrode.

The method may further include forming a light blocking film on the substrate before forming the second gate electrode.

A manufacturing method of a display device according to another exemplary embodiment of the present invention includes: forming a first semiconductor layer of an infrared sensing transistor on a substrate; forming a first gate electrode of the visible light sensing transistor and a third gate electrode of a readout transistor on the substrate, and a second source electrode and a second drain electrode on the substrate and the second semiconductor layer; forming a gate insulating layer covering the first gate electrode, the third gate electrode, the second source electrode, and the second drain electrode; forming a first semiconductor layer overlapping the first gate electrode, and a third semiconductor layer overlapping the third gate electrode on the gate insulating layer; and forming a second gate electrode overlapping the second semiconductor layer on the gate insulating layer, a first source electrode and a first drain electrode on the gate insulating layer and the first semiconductor layer, and a third source electrode and a third drain electrode on the gate insulating layer and the third semiconductor layer.

The first gate electrode, the third gate electrode, the second source electrode, and the second drain electrode may be simultaneously formed.

The second gate electrode, the first source electrode, the first drain electrode, the third source electrode, and the third drain electrode may be simultaneously formed.

According to an exemplary embodiment of the present invention, an infrared sensing transistor, a visible light sensing transistor, and a readout transistor are simultaneously formed with a top gate structure, and the semiconductor layer is formed of a material that is sensitive to infrared rays such that the number of manufacturing processes and the manufacturing cost may be reduced.

Also, the channel passivation layer is formed on the infrared sensing transistor, and the visible light sensing transistor and the readout transistor are formed on the semiconductor layer, such that the characteristics of the transistor may be improved.

Further, the infrared sensing transistor and the visible light sensing transistor have the top gate structure and the readout transistor has the bottom gate structure such that the photosensitivity of the infrared sensing transistor and the visible light sensing transistor may be improved, and the processing speed of the readout transistor may be simultaneously improved, and thereby the semiconductor layer may be appropriate for the objects of the infrared ray sensing, the visible ray sensing, and the control thereof.

Additionally, the infrared sensing transistor has the top gate structure, the semiconductor layer is formed of amorphous silicon-germanium, the visible light sensing transistor has the bottom gate structure including the gate electrode having the opening, the semiconductor layer is made of amorphous silicon, the readout transistor has the bottom gate structure, and the semiconductor layer is made of amorphous silicon, such that the transistor may be formed to be appropriate for the objects of the infrared sensing transistor, the visible light sensing transistor, and the readout transistor.

BRIEF DESCRIPTION OF THE DRAWINGS

FIG. 7 is a graph for the case where SiH4:GeH4=1.2:1 when forming the amorphous silicon-germanium, and FIG. 8 is a graph for the case where SiH4:GeH4=4:1 when forming amorphous silicon-germanium.

DETAILED DESCRIPTION OF THE EMBODIMENTS

Figure 1:
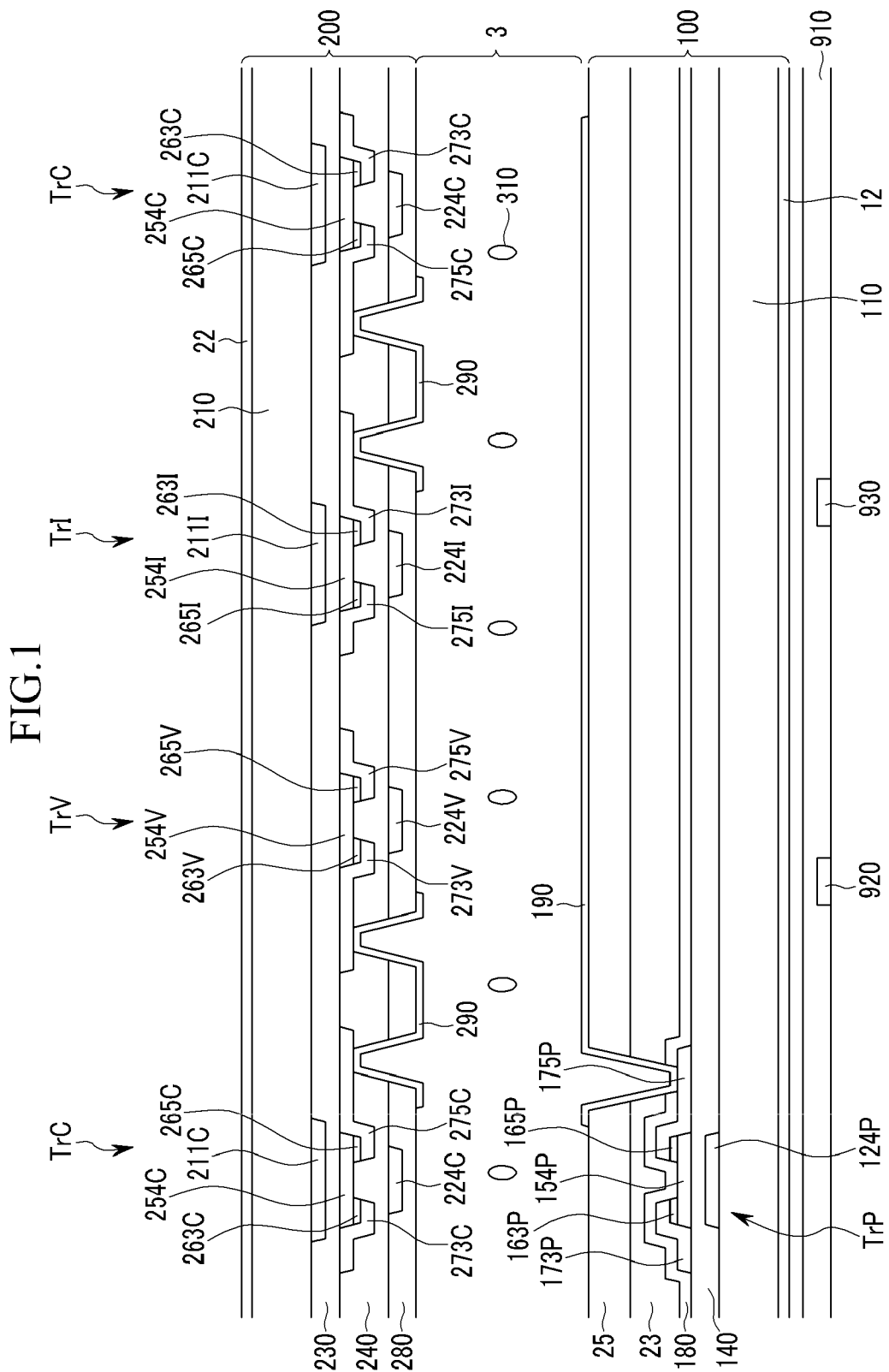
FIG. 1 is a cross-sectional view of a display device according to an exemplary embodiment of the present invention.

Exemplary embodiments of the present invention will be hereinafter described in detail with reference to the accompanying drawings. The structural shapes, sizes, ratios, numbers, etc. are schematically illustrated in the accompanying drawings such that they may be altered more or less. The drawings are shown from the viewpoint of observation such that the direction or location of explaining the drawings may be variously changed depending upon the position of the observer. Even when reference is made to different elements, like reference numerals may be used to designate those elements. When the terms "include," "have," "consist of," or the like are used, the relevant subject may include other parts unless the term "only" is used to define the contents thereof. When explanation is made by way of a singular term, it may be interpreted in a plural manner as well as in a singular manner. Even when the numerical values, shapes, size comparisons, positional relations, etc. are not explained with the adverb "about" or "substantially," they may be so interpreted to include the common error ranges. Even when the terms of "after," "before," "and," "here," "subsequently," or the like are introduced, they are not meant to define temporal locations. The terms of "the first," "the second," . . . , etc. are used only for convenience in distinction selectively, commutatively, or repeatedly, and are not meant to be read in any defined manners. It will be understood that when an element is referred to as being "on," "over," "above," "below," or "beside" another element, it can be directly on the other element or one or more intervening elements may also be present. When the connective "or" is used to connect two elements, it is meant to indicate the respective elements and a combination thereof, but when the quantifier "any one of" is attached to the connective, it is meant to indicate only the respective elements.

Figure 2:
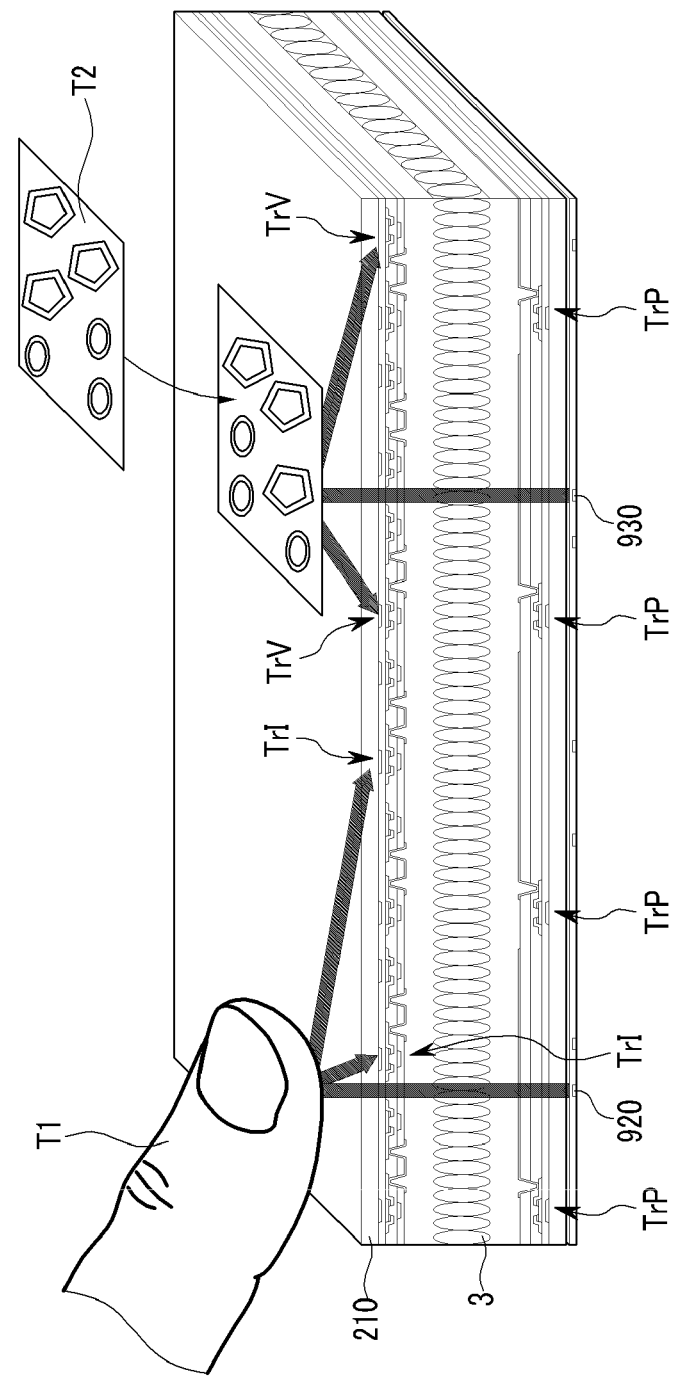
FIG. 2 illustrates a method of sensing an object by using the display device of FIG. 1.

Now, a display device according to an exemplary embodiment of the present invention will be described with reference to FIG. 1 and FIG. 2. FIG. 1 and FIG. 2 show a liquid crystal display; however, the present exemplary embodiment may be applied to various display devices.

FIG. 1 is a cross-sectional view of a display device according to an exemplary embodiment of the present invention.

As shown in FIG. 1, a liquid crystal display includes a lower panel 100 and an upper panel 200 facing each other, and a liquid crystal layer 3 interposed between the two display panels 100 and 200.

The liquid crystal layer 3 has negative dielectric anisotropy, and liquid crystal molecules of the liquid crystal layer 3 may be aligned such that their major axes are perpendicular to the surfaces of the two display panels when an electric field is not applied.

Alignment layers (not shown) may be formed on the inner surfaces of the display panels 100 and 200, and they may be vertical alignment layers. Polarizers (not shown) may be provided on the outer surfaces of the display panels 100 and 200.

Now, the lower panel 100 will be described.

The lower panel 100 includes a lower substrate 110 made of a transparent glass or plastic and a pixel transistor TrP disposed on the lower substrate 110. The pixel transistor TrP includes a gate electrode 124P formed on the lower substrate 110, a gate insulating layer 140 covering the lower substrate 110 and the gate electrode 124P, a semiconductor layer 154P overlapping the gate electrode 124P and disposed on the gate insulating layer 140, an ohmic contact layer (163P, 165P) disposed on the semiconductor layer 154P, a source electrode 173P disposed on the ohmic contact layer (163P, 165P), and a drain electrode 175P separated from the source electrode 173P on the ohmic contact layer (163P, 165P).

The lower panel 100 may further include a gate line disposed on the lower substrate 110 and a data line intersecting the gate 1. Here, the gate line may be connected to the gate electrode 124P of the pixel transistor TrP. Also, the data line may be connected to the source electrode 173P of the pixel transistor TrP.

The lower panel 100 may further include a passivation layer 180 covering the pixel transistor TrP, a color filter 23 disposed on the passivation layer 180, an overcoat 25 disposed on the color filter 23, and a pixel electrode 190 disposed on the overcoat 25. Here, the pixel electrode 190 may be connected to the drain electrode 175P of the pixel transistor TrP while passing through the overcoat 25 and the passivation layer 180.

The upper panel 200 includes an upper substrate 210 made of transparent glass or plastic, and sensing transistors TrI and TrV. The sensing transistors TrI and TrV may include at least one infrared sensing transistor TrI and at least one visible light sensing transistor TrV. The infrared sensor TrI and the visible light sensor TrV may be uniformly formed on the whole upper panel 200 to sense infrared rays and visible light on the whole region of the upper panel 200. As examples, the infrared sensor TrI and the visible light sensor TrV may be alternately arranged, may be disorderly arranged, and may be arranged in a predetermined ratio.

The upper panel 200 may further include a readout transistor TrC connected to the infrared sensing transistor TrI and the visible light sensing transistor TrV and transmitting a detected signal. Here, the readout transistor TrC may be disposed with the same layer as the sensing transistors TrI and TrV and closely thereto.

The infrared sensing transistor TrI, the visible light sensing transistor TrV, and the readout transistor TrC may be disposed on the upper substrate 210. In FIG. 1 and FIG. 2, the infrared sensing transistor TrI, the visible light sensing transistor TrV, and the readout transistor TrC are disposed under the upper substrate 210. However, their positions depend on the deposition sequence.

In detail, the infrared sensing transistor TrI may include a semiconductor layer 254I, ohmic contact layers 263I and 265I, a source electrode 273I, a drain electrode 275I, a gate insulating layer 240, and a gate electrode 224I.

The semiconductor layer 254I is disposed on the upper substrate 210, and may be formed of amorphous silicon-germanium or micro-crystalline silicon. Also, the semiconductor layer 254I may be made of two layers including a lower layer formed of amorphous silicon and an upper layer formed of amorphous silicon-germanium or micro-crystalline silicon, or may be made of two layers including a lower layer of micro-crystalline silicon and an upper layer of amorphous silicon-germanium.

When forming two layers, the deposition speed is improved compared with a single layer of amorphous silicon-germanium or micro-crystalline silicon, and the lower layer formed with the channel is covered by the upper layer such that damage to the channel may be prevented in the manufacturing process, thereby improving characteristics such as transistor speed. The thickness of the semiconductor layer 254I is preferably in the range of 500 Å to 3000 Å. When the thickness is less than 500 Å, it is difficult for the channel to be uniform. When the thickness is more than 3000 Å, the transistor may not have the desiredthinness.

The semiconductor layer 254I may include a lower layer of amorphous silicon, a middle layer of amorphous silicon-germanium, and an upper layer of amorphous silicon.

The amorphous silicon-germanium easily absorbs infrared rays, making it well-suited for the semiconductor layer 254I of the infrared sensing transistor TrI. However, defects exist inside the amorphous silicon-germanium such that the amount of dark current Id flowing in the semiconductor layer 254I of the infrared sensing transistor TrI increases in the absence of infrared rays.

To prevent this problem, the amorphous silicon-germanium is disposed as the middle layer, and the amorphous silicon is formed as the lower layer and the upper layer such that the dark current Id may be prevented from flowing. Accordingly, the amount of the dark current Id is reduced and infrared sensitivity may be improved.

When the semiconductor layer 254I is formed of three layers, the thickness of the lower layer may be in the range 200 Å to 400 Å, the thickness of the middle layer may be in the range of 4000 Å to 8000 Å, and the thickness of the upper layer may be in the range of 200 Å to 400 Å.

When the thickness of the lower layer and the upper layer is less than 200 Å, the dark current Id may not be effectively prevented. When the thickness of each of the lower layer and the upper layer is more than 400 Å, the infrared sensitivity of the infrared sensing transistor may be decreased. Also, when the thickness of the middle layer is less than 4000 Å, the infrared sensitivity of the infrared sensing transistor may be decreased. When the thickness of the middle layer is more than 8000 Å, the infrared sensing transistor may not have the desired thinness.

The ohmic contact layers 263I and 265I may be disposed on the semiconductor layer 254I. The source electrode 273I may be disposed on the ohmic contact layer 263I. The drain electrode 275I may be separated from the source electrode 273I on the ohmic contact layer 265I. The gate insulating layer 240 covers the semiconductor layer 254I, the source electrode 273I, and the drain electrode 275I. The gate electrode 224I may overlap the semiconductor layer 254I on the gate insulating layer 140. The passivation layer 280 for protecting the gate electrode 224I may be formed on the gate electrode 224I.

The infrared sensing transistor TrI may further include a light blocking film 211I overlapping the semiconductor layer 254I under the semiconductor layer 254I. In detail, the light blocking film 211I may be disposed between the upper substrate 210 and the semiconductor layer 254I, and prevents the semiconductor layer 254I from being exposed to visible rays. Here, a blocking insulating layer 230 made of an insulating material such as silicon nitride may be formed between the light blocking film 211I and the semiconductor layer 254I.

The light blocking film 211I may include a material that blocks the visible rays provided from the outside of the liquid crystal display. For example, the light blocking film 211I may include an organic material or amorphous silicon including black pigments.

The light blocking film 211I blocks the visible rays that are incident on the liquid crystal display from the outside to thereby improve the signal-to-noise ratio (SNR) of the signal and the noise, and to minimize the sensitivity of the semiconductor layer 254I including the amorphous silicon-germanium to the infrared ray region such that the influence of the visible rays may be efficiently prevented.

The readout transistor TrC may be connected to the infrared sensing transistor TrI through an overpass 290, and the readout transistor TrC may be connected to the infrared sensing transistor TrI through a drain electrode 275C.

The readout transistor TrC may include a semiconductor layer 254C, ohmic contact layers 263C and 265C, a source electrode 273C, a drain electrode 275C, a gate insulating layer 240, and a gate electrode 224C.

The semiconductor layer 254C may be disposed on the upper substrate 210, and may be made of amorphous silicon, amorphous silicon-germanium, or micro-crystalline silicon. Also, the semiconductor layer 254C may be made of two layers including a lower layer formed of amorphous silicon and an upper layer formed of amorphous silicon-germanium or micro-crystalline silicon, or may be made of two layers including a lower layer of micro-crystalline silicon and an upper layer of amorphous silicon-germanium. The thickness of the semiconductor layer 254C is preferably in the range of 500 Å to 3000 Å. When the thickness is less than 500 Å, it is difficult for the channel to be uniform, and when the thickness is more than 3000 Å, the transistor may not have the desired thinness.

The ohmic contact layers 263C and 265C may be disposed on the semiconductor layer 254C. The source electrode 273C may be disposed on the ohmic contact layer 263C. The drain electrode 275C may be separated from the source electrode 273C on the ohmic contact layer 265C. The gate insulating layer 240 may be disposed on the semiconductor layer 254C, the source electrode 273Cm and the drain electrode 275C. The gate electrode 224C may overlap the semiconductor layer 254C on the gate insulating layer 140. A passivation layer 280 for protecting the gate electrode 224C may be formed on the gate electrode 224C.

The readout transistor TrC may further include a light blocking film 211C overlapping the semiconductor layer 254C under the semiconductor layer 254C. In detail, the light blocking film 211C may be disposed between the upper substrate 210 and the semiconductor layer 254C, and prevents the semiconductor layer 254C from being exposed to the visible rays. Here, a blocking insulating layer 230 made of an insulating material such as silicon nitride may be formed between the light blocking film 211C and the semiconductor layer 254C.

Meanwhile, the visible light sensing transistor TrV sensing the visible rays is disposed on the upper substrate 210, and the readout transistor TrC electrically connected to the visible light sensing transistor TrV is disposed with the same layer as the visible light sensing transistor TrV. In detail, the visible light sensing transistor TrV may include a semiconductor layer 254V, ohmic contact layers 263V and 265V, a source electrode 273V, a drain electrode 275V, a gate insulating layer 240, and a gate electrode 224V.

The semiconductor layer 254V may be disposed on the upper substrate 210, and may be made of amorphous silicon, amorphous silicon-germanium, or micro-crystalline silicon. Also, the semiconductor layer 254V may be made of two layers including a lower layer formed of amorphous silicon and an upper layer formed on amorphous silicon-germanium or micro-crystalline silicon, or may be made of two layers including a lower layer of micro-crystalline silicon and an upper layer of amorphous silicon-germanium. The thickness of the semiconductor layer 254V is preferably in the range of 500 Å to 3000 Å. When the thickness is less than 500 Å it is difficult for the channel to be uniform, and when the thickness is more than 3000 Å the transistor may not be sufficiently down-sized.

The ohmic contact layers 263V and 265V may be disposed on the semiconductor layer 254V. The source electrode 273V may be disposed on the ohmic contact layer 263V. The drain electrode 275V may be separated from the source electrode 273V on the ohmic contact layer 265V. The gate insulating layer 240 is disposed on the semiconductor layer 254V, the source electrode 273V, and the drain electrode 275V. The gate electrode 224V may overlap the semiconductor layer 254V on the gate insulating layer 140. A passivation layer 280 for protecting the gate electrode 224V may be formed on the gate electrode 224V.

The readout transistor TrC may be connected to the visible light sensing transistor TrV through the overpass 290, and the readout transistor TrC may be connected to the visible light sensing transistor TrV through the drain electrode 275C.

The liquid crystal display may include a lower polarizer 12 disposed under the lower panel 100 and an upper polarizer 22 disposed on the upper panel 200. The intensity of the light provided to the lower panel 100 and the upper panel 200 is controlled by using the polarization characteristics of the lower polarizer 12 and the upper polarizer 22.

The liquid crystal display may further include a backlight unit 910 disposed under the lower panel 100. The backlight unit 910 includes at least one infrared ray emitting member 920 and at least one visible ray emitting member 930. The infrared ray emitting member 920 and the visible ray emitting member 930 may be point light sources such as light-emitting devices (LEDs). Also, the infrared rays and the visible rays respectively emitted from the infrared ray emitting member 920 and the visible ray emitting member 930 may be orthogonally incident on the lower panel.

The infrared ray emitting member 920 and the visible ray emitting member 930 may be uniformly distributed on the whole backlight unit 910 to provide the infrared rays and the visible rays to all of the backlight unit 910. The infrared ray emitting member 911 and the visible ray emitting member 912 may be alternately arranged, irregularly arranged, or arranged in a predetermined ratio.

FIG. 2 illustrates a method for sensing an object by using the display device of FIG. 1.

As shown in FIG. 2, the infrared rays and the visible rays are generated in the backlight unit 910. The infrared rays sequentially pass through the lower polarizer 12, the lower panel 100, the liquid crystal layer 3, the upper panel 200, and the upper polarizer 22.

Similarly, the visible rays sequentially pass through the lower polarizer 12, the lower panel 100, the liquid crystal layer 3, the upper panel 200, and the upper polarizer 22. Here, the visible rays may be changed to colored rays by the color filter 23 of the lower panel 100.

For the touch sensing of a first object T1 positioned on the liquid crystal display, the infrared rays provided from the backlight unit 910 may be used. When the first object T1 is close to the liquid crystal display, the infrared rays emitted from the liquid crystal display are reflected by the first object T1. The reflected infrared rays are incident to and detected by the infrared ray sensor TrI positioned in the upper panel 200. This way, the touch sensing for the first object T1 is executed, detecting the occurrence of physical contact with the first object T1, the position of the contact, and the shape and size of the first object T1.

When the gray of the visible light emitted from the liquid crystal display is brighter than the gray of the visible light incident on the liquid crystal display from the outside, the visible light emitted from the liquid crystal display may be used for the image sensing under the image sensing for a second object T2 close to the liquid crystal display. In detail, the visible light emitted from the sensing device is reflected by the second object T2. The reflected visible light is incident on and detected by the visible ray sensor TrV positioned in the upper panel 200. Accordingly, the image sensing for the second object T2 is executed, and image information for the second object T2 (such as the shape, the size, and the color) may be obtained.

After confirming the contact location of the second object T2 through touch sensing, the gray of the visible light emitted from the liquid crystal display toward the contact location may be selectively changed such that the image sensing for the second object T2 may be further effectively executed. For example, when the gray of the visible light emitted from the liquid crystal display is darker than the gray of the visible ray incident on the liquid crystal display from the outside, the touch sensing using the infrared rays is executed. The gray of the visible rays emitted from the liquid crystal display toward the contact location of the second object T2 recognized through the touch sensing is selectively brightened, making effective image sensing of the second object T2 possible.

As described above, in the exemplary embodiment of the present invention, the infrared sensing transistor TrI, the visible light sensing transistor TrV, and the readout transistor TrC may be simultaneously formed such that the number of manufacturing processes and the manufacturing cost may be reduced.

Also, in the exemplary embodiment, the gate electrodes of the infrared sensing transistor TrI and the visible light sensing transistor TrV are all formed on the semiconductor layer, and a planar type of top gate structure in which the source electrode and the drain electrode are formed between the semiconductor layer and the gate electrode is formed. With the top gate structure, the area of the semiconductor layer that is exposed to external light may be maximized. Accordingly, photosensitivity may be improved compared to the transistor of the bottom gate structure in which the gate electrode is formed under the semiconductor layer. Also, in the readout transistor TrC, the light blocking film is formed under the semiconductor layer, thereby preventing its exposure to external light.

Figure 3:
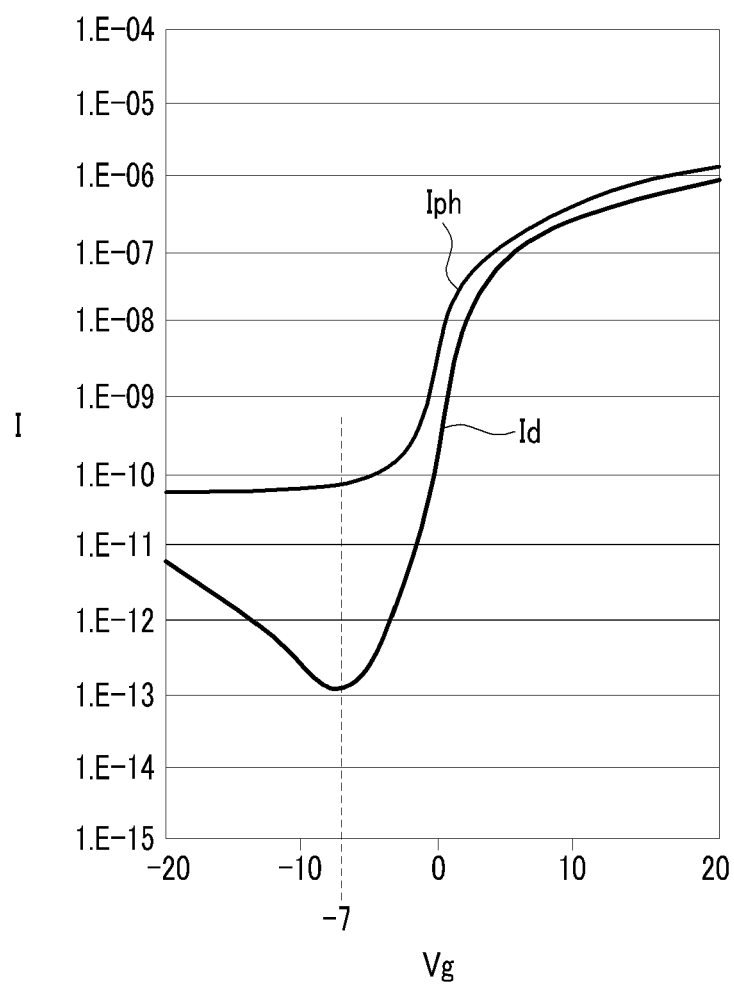
FIG. 3 is a graph showing photosensitivity of a semiconductor layer made of amorphous silicon in a transistor of a planar type top gate structure according to the present invention.
Figure 4:
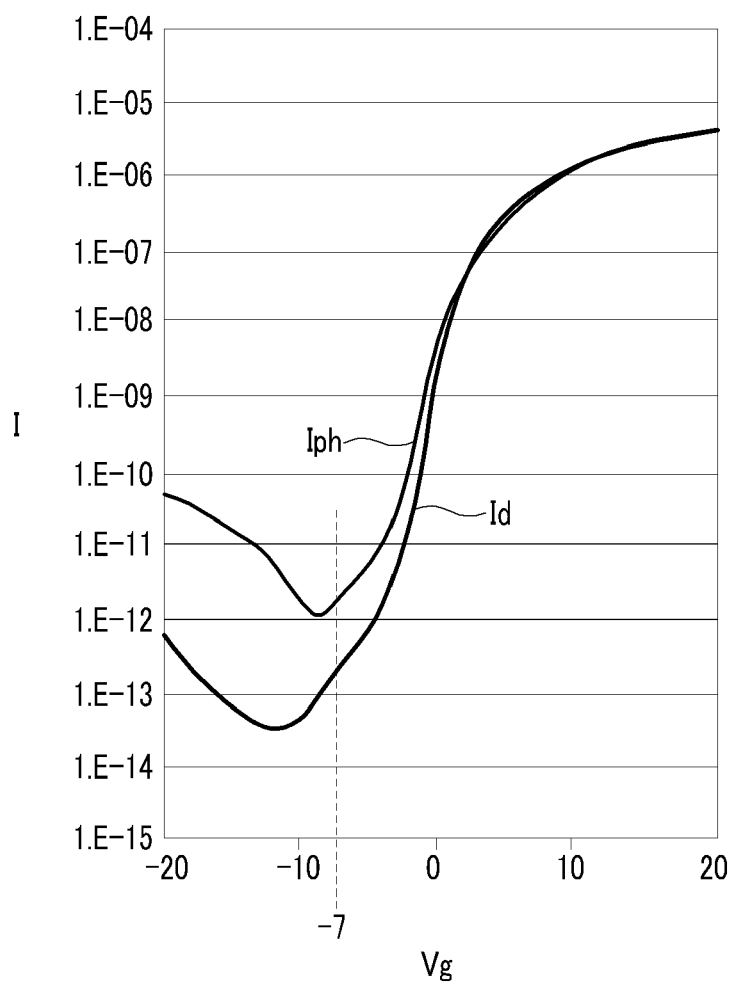
FIG. 4 is a graph showing photosensitivity of a semiconductor layer made of amorphous silicon in a transistor of a bottom gate structure.

FIG. 3 is a graph showing the photosensitivity of a semiconductor layer made of amorphous silicon in a transistor having a planar type of top gate structure according to the present invention. FIG. 4 is a graph showing the photosensitivity of a semiconductor layer made of amorphous silicon in a transistor having a bottom gate structure.

The graphs of FIG. 3 and FIG. 4 show photosensitivity for different transistor structures under substantially the same conditions.

As shown in FIG. 3 and FIG. 4, when the gate voltage Vg is −7V, the ratio of the current Iph to the current Id is more than 48 times the ratio of the currents Iph and Id in the transistor having the bottom gate structure. The current Iph is the current flowing in the transistor when a planar-type, top-gate structure transistor is exposed to visible rays, and the current Id is the current flowing in the same type of transistor when the transistor is not exposed to visible rays. Accordingly, visible ray sensitivity is improved in the transistor of the planar type of top gate structure compared to a transistor of the bottom-gate structure.

Figure 5:
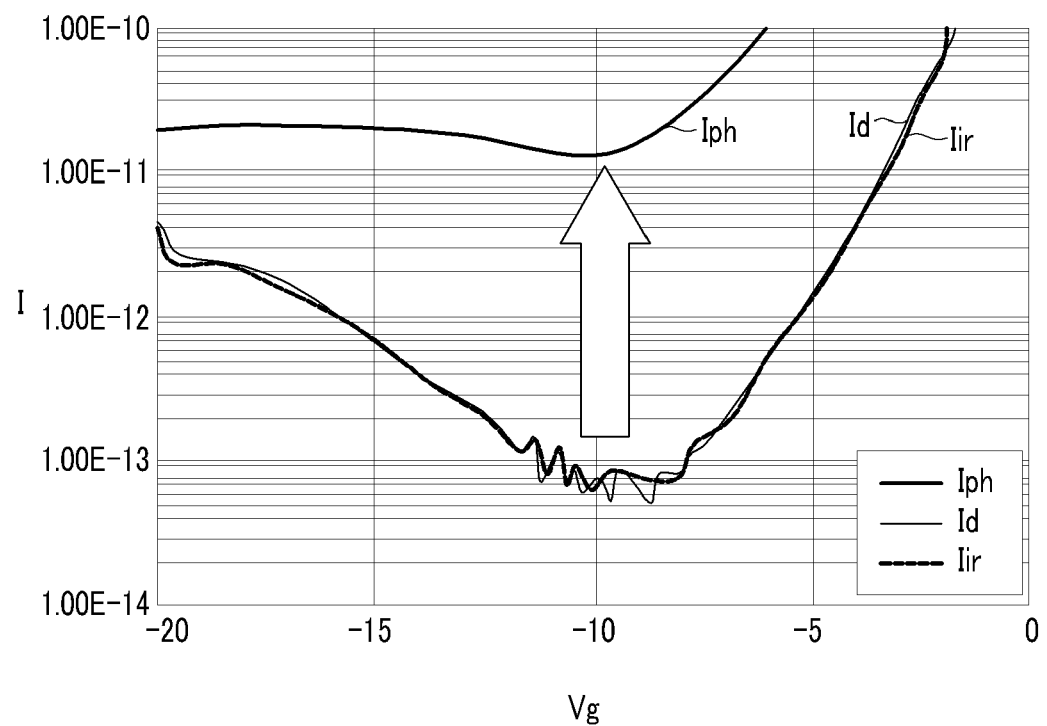
FIG. 5 is a graph showing infrared sensitivity of a semiconductor layer made of amorphous silicon in a transistor of a bottom gate structure.
Figure 6:
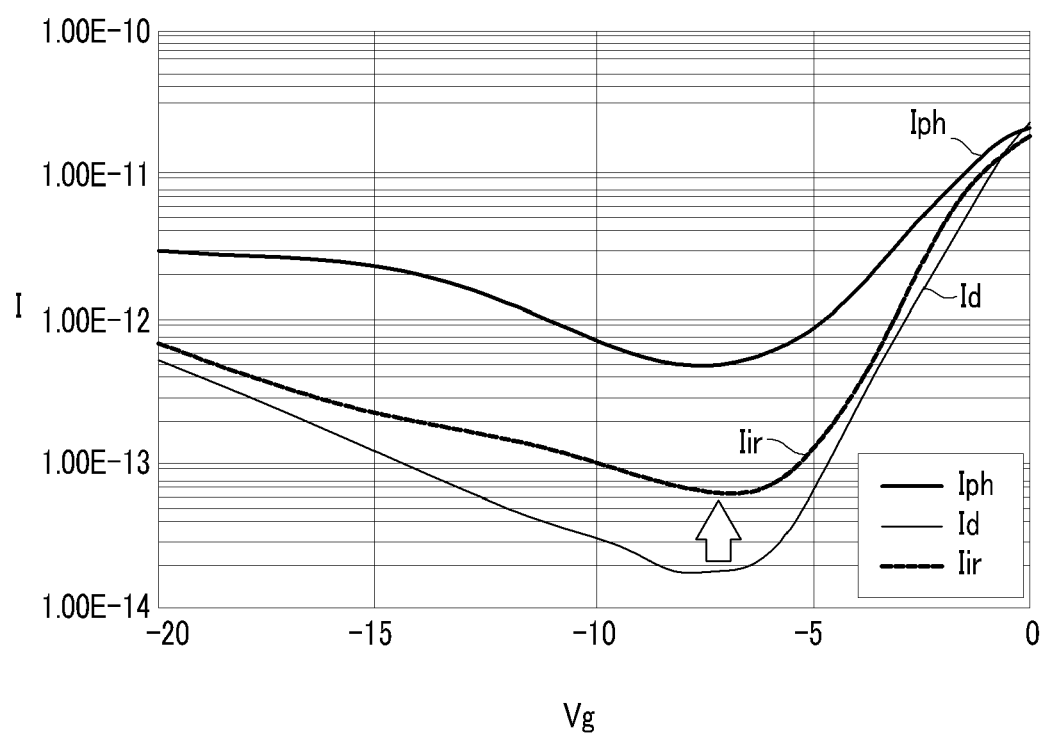
FIG. 6 is a graph showing infrared sensitivity of a semiconductor layer made of amorphous silicon-germanium in a transistor of a bottom gate structure.

FIG. 5 is a graph showing infrared sensitivity of a semiconductor layer made of amorphous silicon in a transistor of a bottom gate structure, and FIG. 6 is a graph showing infrared sensitivity of a semiconductor layer made of amorphous silicon-germanium in a transistor of a bottom gate structure.

As shown in FIG. 5, when the transistor including the semiconductor layer made of the amorphous silicon is exposed to infrared rays, the current Iir flowing in the transistor that is sensitive to the infrared rays is almost the same as the current Id of the transistor when the transistor is not exposed to infrared rays. However, as shown in FIG. 6, when the transistor including the semiconductor layer made of the amorphous silicon-germanium is exposed to infrared rays, current Iir flowing through the transistor that is sensitive to infrared rays is higher than the current Id. These data indicate that forming the semiconductor layer of the infrared sensing transistor TrI with amorphous silicon-germanium improves infrared ray sensitivity.

Also, as shown in FIG. 6, when the transistor includes a semiconductor layer made of amorphous silicon-germanium and the semiconductor layer is exposed to light, the semiconductor layer is sensitive to the visible rays and generates the current Iph.

Accordingly, in the infrared sensing transistor, the visible light sensing transistor, and the readout transistor of the exemplary embodiment, the semiconductor layer is formed of the material that is sensitive to both the infrared rays and the visible rays. This way, it is easier to sense the infrared rays, and the number of manufacturing processes may be reduced.

Figure 7:
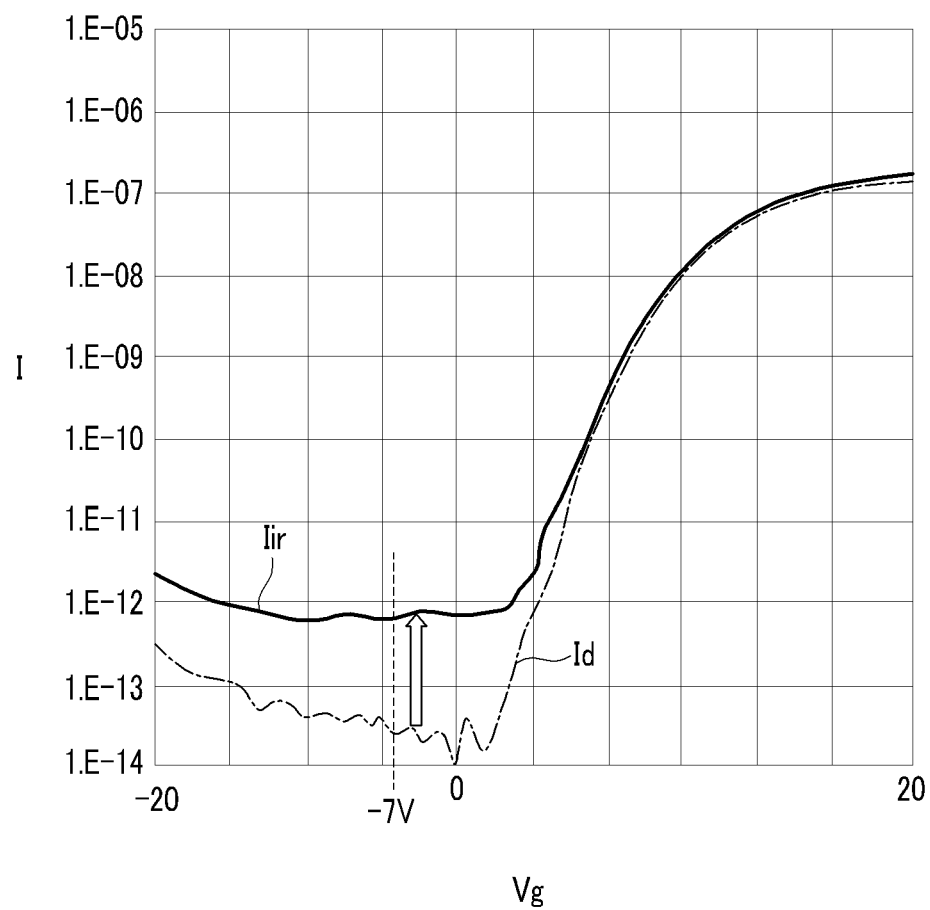
FIG. 7 and FIG. 8 are graphs showing infrared sensitivity when a lower layer of a semiconductor layer is made of amorphous silicon and an upper layer of a semiconductor layer is formed of amorphous silicon-germanium in a top gate transistor. More specifically.
Figure 8:
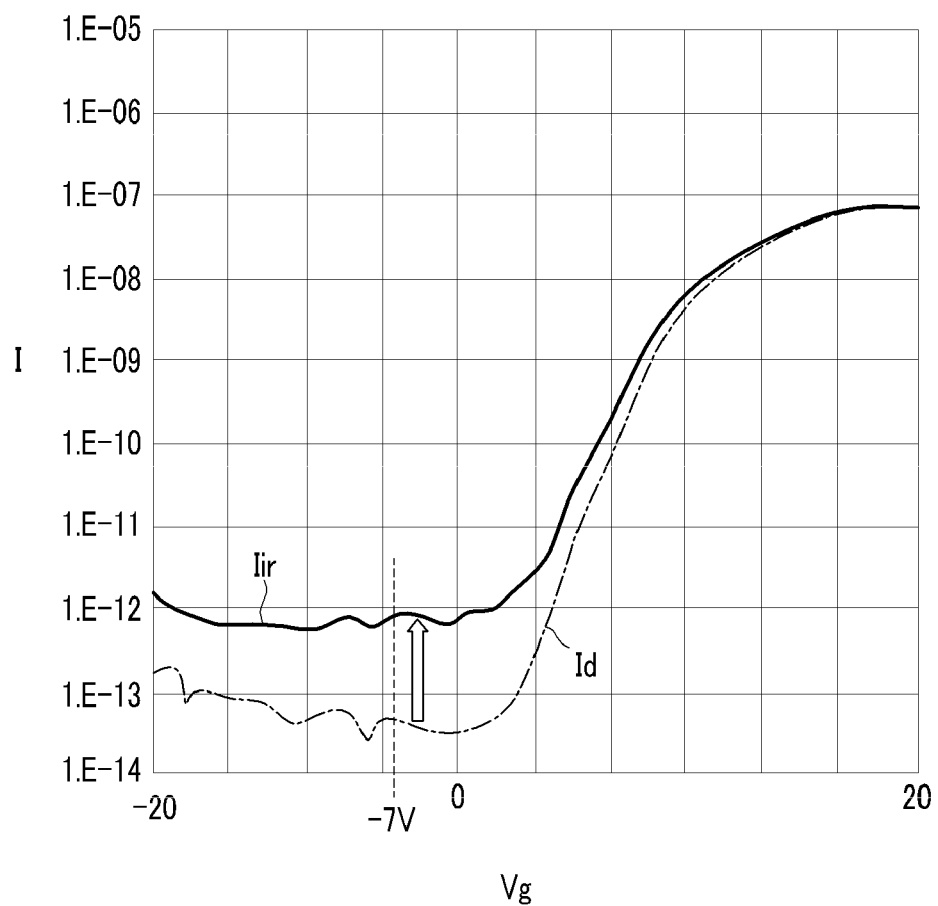

FIG. 7 and FIG. 8 are graphs showing infrared sensitivity when a lower layer of a semiconductor layer is made of amorphous silicon and an upper layer of a semiconductor layer is formed of amorphous silicon-germanium in a top gate transistor. More specifically, FIG. 7 represents a case where SiH4:GeH4=1.2:1 when forming the amorphous silicon-germanium, and FIG. 8 represents a case where SiH4:GeH4=4:1 when forming the amorphous silicon-germanium.

As shown in FIG. 7, when SiH4 and GeH4 are mixed at a molar ratio of 1.2:1 to form the amorphous silicon-germanium and the gate voltage Vg is −7V, the ratio of the currents Iir to Id is about 29.4. As shown in FIG. 8, when SiH4 and GeH4 are mixed at a molar ratio of 4:1 to form the amorphous silicon-germanium and the gate voltage is −7V, the ratio of the currents Iir to Id is about 18.

The ratio of the currents Iir and Id has higher reaction sensitivity compared with the ratio of the currents Iir and Id when the semiconductor layer is formed of the amorphous silicon-germanium in the transistor of the bottom gate structure as shown in FIG. 6. More specifically, Iir:Id=13 in a top gate structure transistor while the same ratio is only about 3 in an amorphous silicon-germanium transistor of the bottom gate structure used to generate FIG. 6. Although the conditions such as the material of the semiconductor layer are different from the graph shown in FIG. 6, data indicates that the transistor of the top gate structure has better sensitivity to infrared rays than the transistor of the bottom gate structure.

FIG. 7 and FIG. 8 are graphs of the sensitivity of the infrared rays measured under substantially the same conditions except for the ratio of SiH4:GeH4 in the transistor.

From the results of FIG. 7 and FIG. 8, when the amount of GeH4 is greater than the amount of SiH4, the ratio of the currents Iir to Id is high. Accordingly, when forming the amorphous silicon-germanium layer, it is good for the amount of GeH4 to be higher than that of SiH4, and preferably the mixture ratio of SiH4 to GeH4 may be between about 1:1 to 5:1, inclusive.

Figure 9:
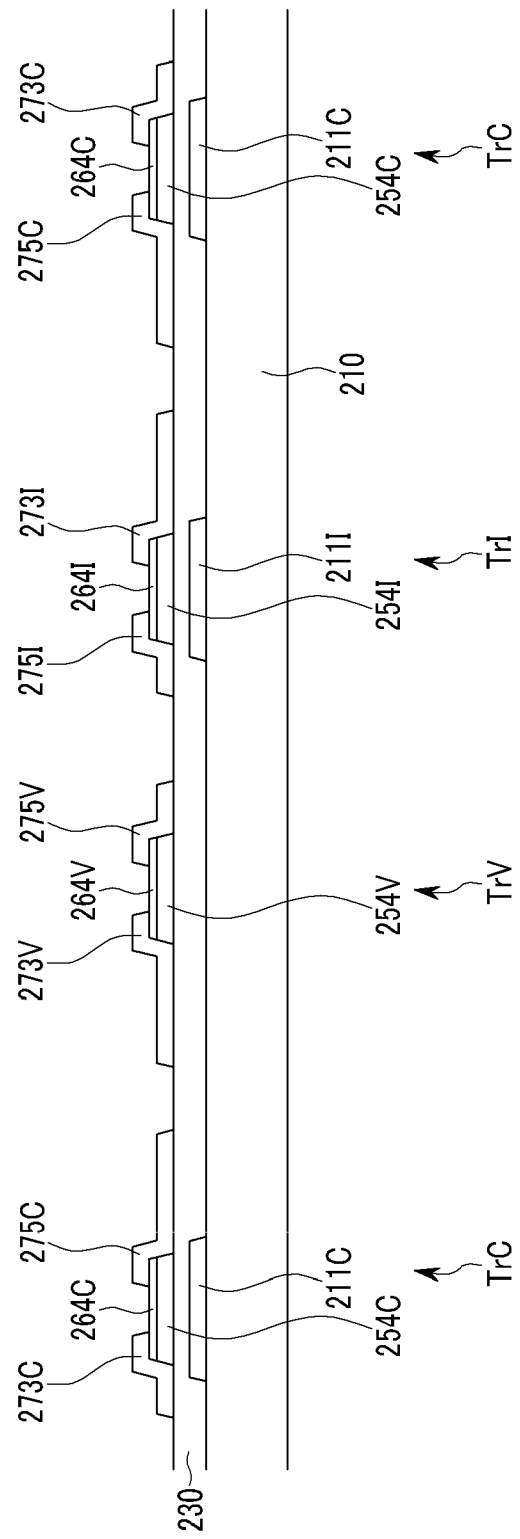
FIG. 9 and FIG. 10 are cross-sectional views showing different stages of manufacturing the liquid crystal display of FIG. 1.
Figure 10:
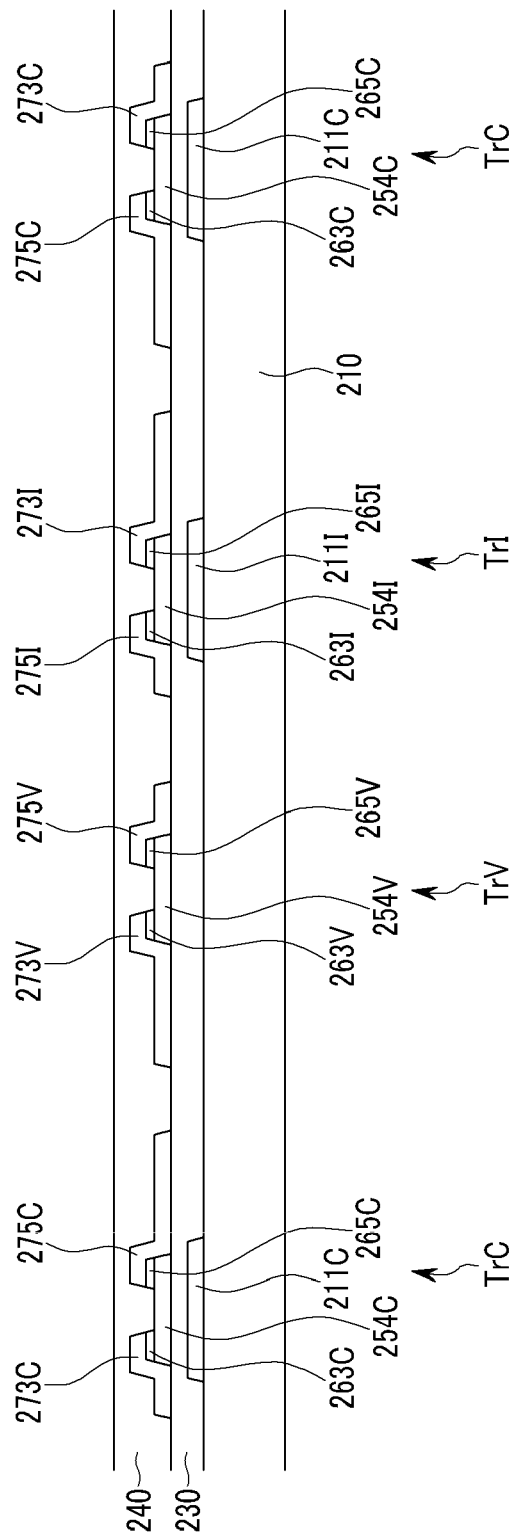

FIG. 9 and FIG. 10 are cross-sectional views showing different stages of manufacturing the liquid crystal display of FIG. 1. The manufacturing method of the liquid crystal display of FIG. 1 will be described in reference to FIG. 9 and FIG. 10.

As shown in FIG. 9, light blocking films 211I and 211C made of an organic material or amorphous silicon including black pigments are formed on a substrate 210. Also, a blocking insulating layer 230 made of an insulating material such as silicon nitride covering the substrate 210 and the light blocking film is formed. Further, a semiconductor material and an ohmic contact material are sequentially formed on the blocking insulating layer 230. Here, the semiconductor material may be formed of amorphous silicon-germanium or micro-crystalline silicon. The semiconductor material may be made of two layers including a lower layer of amorphous silicon and an upper layer of amorphous silicon-germanium or micro-crystalline silicon, or two layers including a lower layer of micro-crystalline silicon and an upper layer of amorphous silicon-germanium. The semiconductor material and the ohmic contact material are etched to form the semiconductor layer 254V and an ohmic contact layer 264V of the visible light sensing transistor, the semiconductor layer 254I, and the ohmic contact layer 264I of the infrared sensing transistor, and the semiconductor layer 254C and an ohmic contact layer 264C of the readout transistor. Here, it is preferable that the semiconductor layers 254I and 254C overlap the light blocking films 211I and 211C.

Next, as shown in FIG. 10, the source electrodes 273V, 273I, and 273C and the drain electrodes 275V, 275I, and 275C are formed on the substrate 210 and the ohmic contact layers 264V, 264I, and 264C. Also, the ohmic contact layers 264V, 264I, and 264C that are exposed between the source electrodes 273V, 273I, and 273C and the drain electrodes 275V, 275I, and 275C are etched to form ohmic contact layers 263V, 265V, 263I, 265I, 263C, and 265C. Next, a gate insulating layer 240 covering the source electrodes 273V, 273I, and 273C and the drain electrodes 275V, 275I, and 275C is formed.

Next, as shown in FIG. 1, gate electrodes 224V, 224I, and 224C overlapping the semiconductor layers 254V, 254I, and 254C are formed on the gate insulating layer 240. Also, a passivation layer 280 is formed on the gate electrodes 224V, 224I, and 224C.

Figure 11:
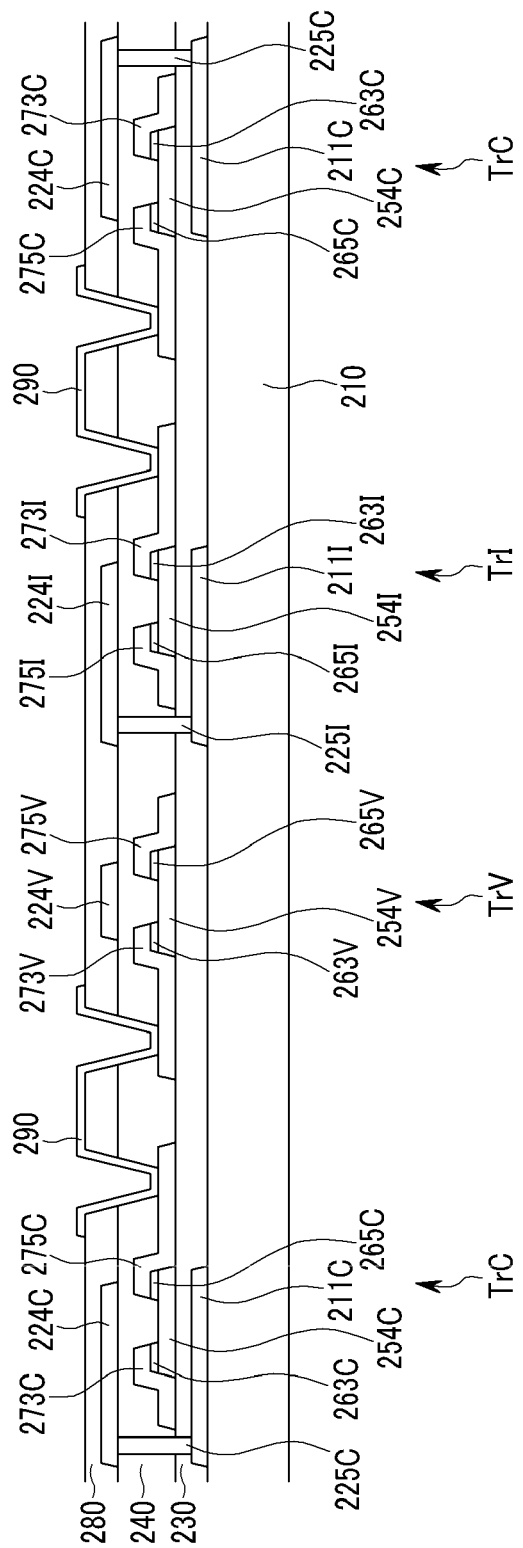
FIG. 11 is a cross-sectional view of a display device according to another exemplary embodiment of the present invention.

FIG. 11 is a cross-sectional view of a display device according to another exemplary embodiment of the present invention.

The present exemplary embodiment is substantially the same as the exemplary embodiment shown in FIG. 1, with a primary difference being that the light blocking film and the gate electrode are connected to each other through the connecting member. In the interest of avoiding redundancy, descriptions of elements that are provided above will not be repeated.

As shown in FIG. 11, the light blocking films 211C and 211I, and the gate electrodes 224C and 224I, are connected through a connecting member 225C such that an operation failure of the transistor by the light blocking films 211C and 211I may be prevented. That is, the light blocking films 211C and 211I made of amorphous silicon are separated from each other and absorb the external light such that a slight charge may be generated, affecting the operation of the transistor. Accordingly, to prevent this problem, the light blocking films 211C and 211I and the gate electrodes 224C and 224I are connected through the connecting member 225C. Also, a common voltage that is maintained as a uniform voltage is applied to the light blocking films 211C and 211I such that the operation failure of the transistor by the light blocking films 211C and 211I may be prevented.

Figure 12:
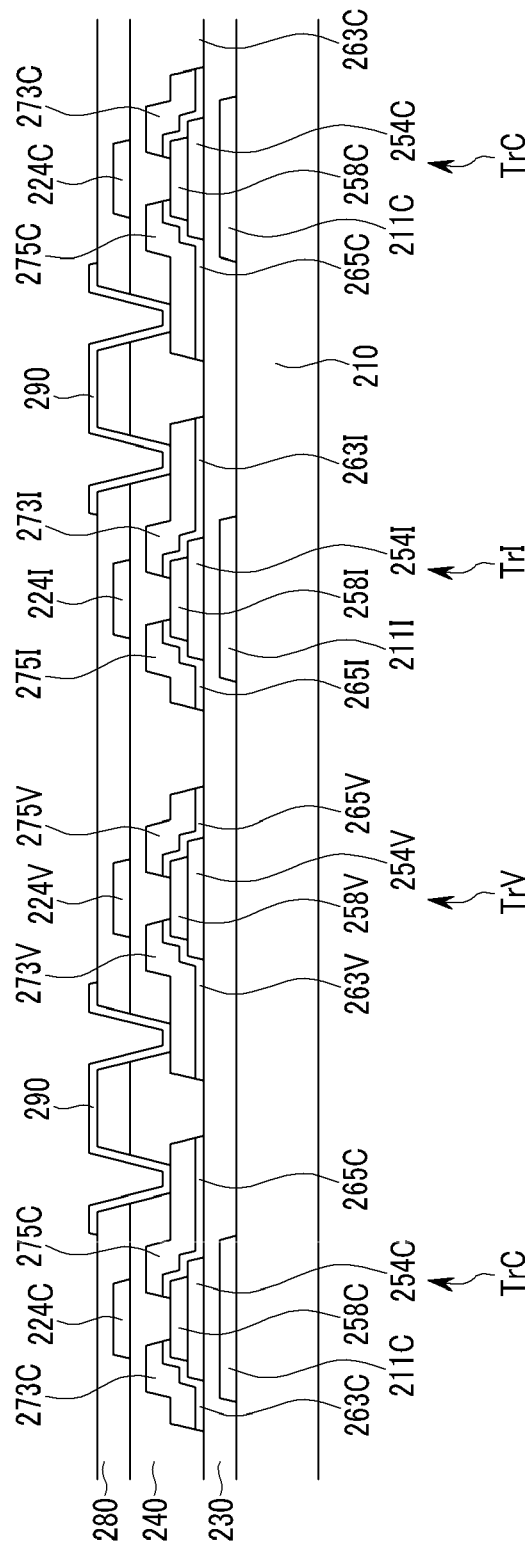
FIG. 12 is a cross-sectional view of a display device according to another exemplary embodiment of the present invention.

FIG. 12 is a cross-sectional view of a display device according to another exemplary embodiment of the present invention.

The present exemplary embodiment is substantially the same as the exemplary embodiment shown in FIG. 1, with a primary difference being that a channel passivation layer is formed. In the interest of avoiding redundancy, descriptions of elements that are provided above will not be repeated.

A channel passivation layer 258I for protecting the channel of the semiconductor layer 254I is formed on the semiconductor layer 254I of the infrared sensing transistor TrI. The channel passivation layer 258I may be made of silicon nitride or silicon oxide. Ohmic contact layers 263I and 265I may be formed on the blocking insulating layer 230, the semiconductor layer 254I, and the channel passivation layer 258I. A source electrode 273I may be formed on the ohmic contact layer 263I. The drain electrode 275I may be separated from the source electrode 273I on the ohmic contact layer 265I.

A channel passivation layer 258C for protecting the channel of the semiconductor layer 254C may be formed on the semiconductor layer 254C of the readout transistor TrC. The channel passivation layer 258C may be made of silicon nitride or silicon oxide. Ohmic contact layers 263C and 265C may be formed on a portion of the blocking insulating layer 230, the semiconductor layer 254C, and the channel passivation layer 258C. The source electrode 273C may be disposed on the ohmic contact layer 263C. The drain electrode 275C may be separated from the source electrode 273C on the ohmic contact layer 265C.

A channel passivation layer 258V for protecting the channel of the semiconductor layer 254V is formed on the semiconductor layer 254V of the visible light sensing transistor TrV. The channel passivation layer 258V may be made of silicon nitride or silicon oxide. Ohmic contact layers 263V and 265V may be formed on a portion of the blocking insulating layer 230, the semiconductor layer 254V, and the channel passivation layer 258V. The source electrode 273V may be formed on the ohmic contact layer 263V. The drain electrode 275V may be separated from the source electrode 273V on the ohmic contact layer 265V.

These channel passivation layers 258V, 258I, and 258C prevent damage to the semiconductor layer through overetching of the ohmic contact layer in the process of etching the ohmic contact layer such that the characteristics of the transistor may be improved, and the semiconductor layer may be formed thinly such that it is easier to manufacture the thin film transistor.

Figure 13:
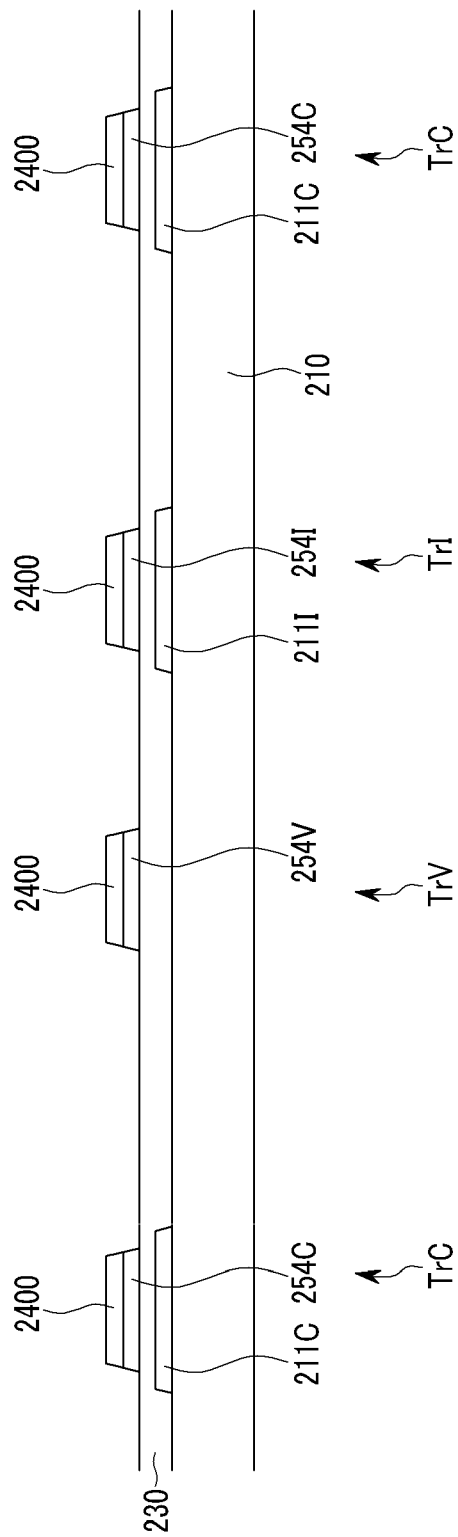
FIG. 13 and FIG. 14 are cross-sectional views showing different stages of manufacturing the liquid crystal display of FIG. 12.
Figure 14:
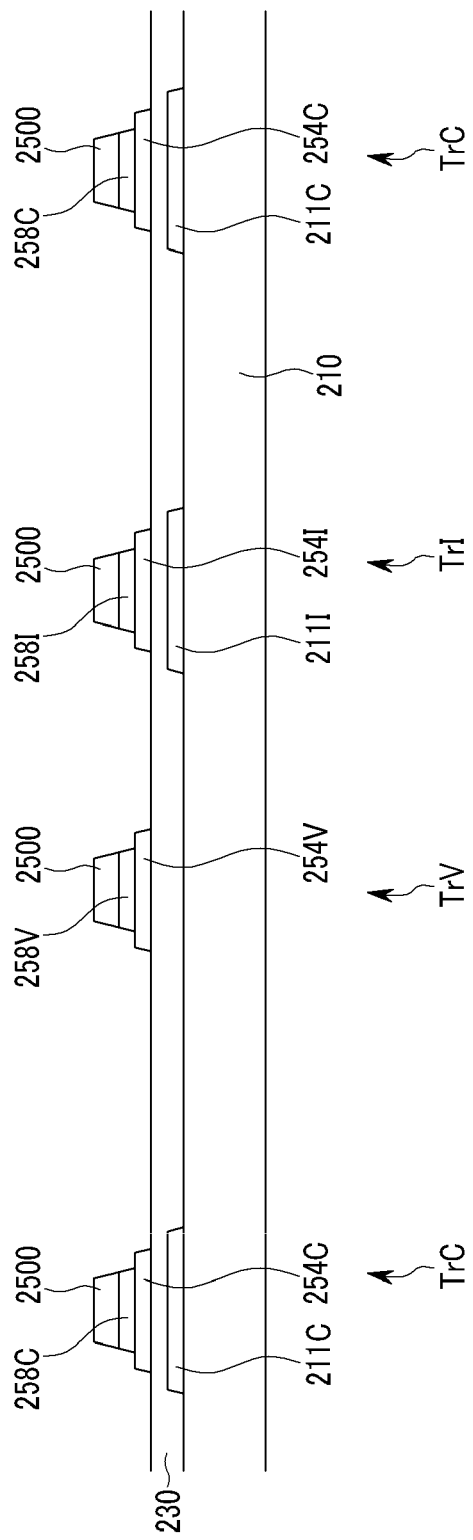

FIG. 13 and FIG. 14 are cross-sectional views showing different stages of manufacturing the liquid crystal display of FIG. 12. The manufacturing method of the liquid crystal display of FIG. 12 will be described with reference to FIGS. 12, 13, and 14.

The present exemplary embodiment is substantially the same as the exemplary embodiment shown in FIGS. 1, 9, and 10, with a primary difference being the manufacturing method of the channel passivation layer. In the interest of avoiding redundancy, any descriptions of elements provided above will not be repeated.

As shown in FIG. 13, a semiconductor material is formed on a blocking insulating layer 230, and a first photosensitive film pattern 2400 is formed on the semiconductor material. The semiconductor material is etched by using the first photosensitive film pattern 2400 to form semiconductor layers 254V, 254I, and 254C. The first photosensitive film pattern 2400 is then removed.

Next, as shown in FIG. 14, a channel passivation layer material is formed on the semiconductor layers 254V, 254I, and 254C, and a second photosensitive film pattern 2500 is formed on the channel passivation layer material. Next, the channel passivation layer material is etched by using the second photosensitive film pattern 2500 to form the channel passivation layers 258V, 258I, and 258C. The second photosensitive film pattern 2500 is then removed.

Next, as shown in FIG. 12, an ohmic contact material and a conductive layer are sequentially formed on the substrate 210, the semiconductor layers 254V, 254I, and 254C, and the channel passivation layers 258V, 258I, and 258C. Next, the ohmic contact material and the conductive layer are etched to form ohmic contact layers 264V, 264I, and 264C, source electrodes 273V, 273I, and 273C, and drain electrodes 275V, 275I, and 275C. Next, the ohmic contact layers 264V, 264I, and 264C that are exposed between the source electrodes 273V, 273I, and 273C and the drain electrodes 275V, 275I, and 275C are etched to form divided ohmic contact layers 263V, 265V, 263I, 265I, 263C, and 265C. Also, a gate insulating layer 240 covering the source electrodes 273V, 273I, and 273C and the drain electrodes 275V, 275I, and 275C is formed. Next, gate electrodes 224V, 224I, and 224C overlapping the semiconductor layers 254V, 254I, and 254C are formed on the gate insulating layer 240. Next, a passivation layer 280 is formed on the gate electrodes 224V, 224I, and 224C.

Unlike the exemplary embodiment of the manufacturing method of the liquid crystal display shown in FIG. 12, the semiconductor layer and the channel passivation layer may be simultaneously formed by using the photosensitive film pattern having different thicknesses depending on position.

Figure 15:
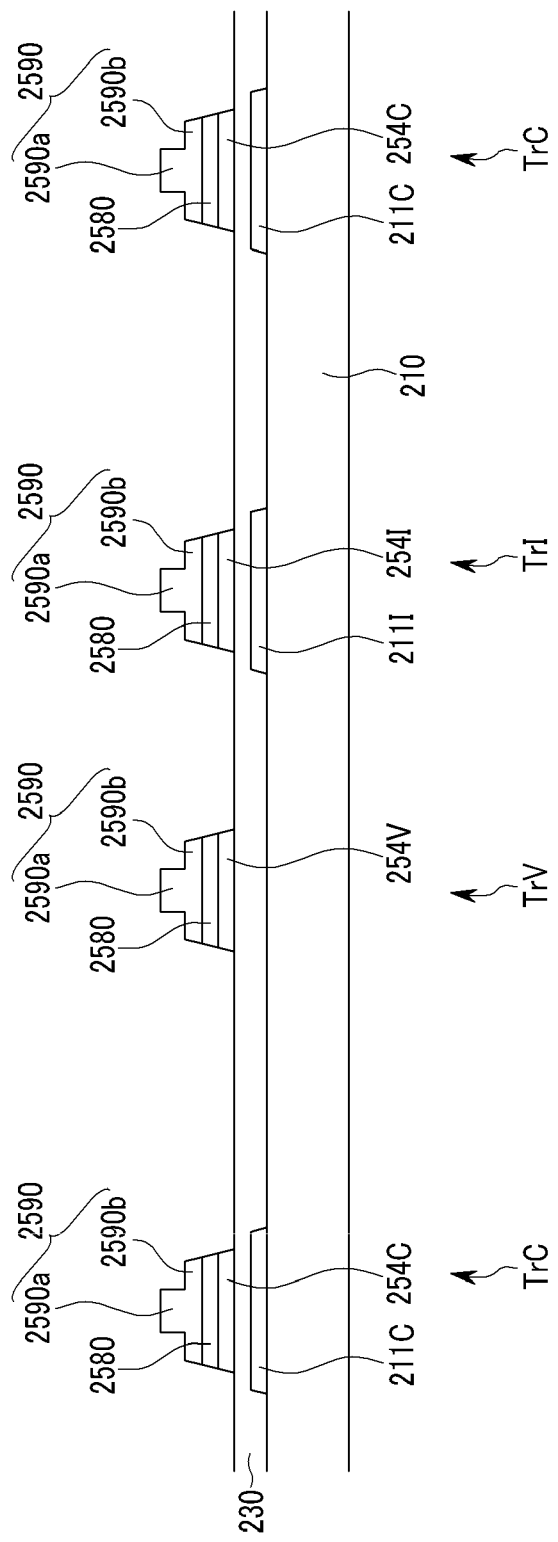
FIG. 15 and FIG. 16 are cross-sectional views showing different stages of manufacturing the liquid crystal display of FIG. 12, according to another exemplary embodiment.
Figure 16:
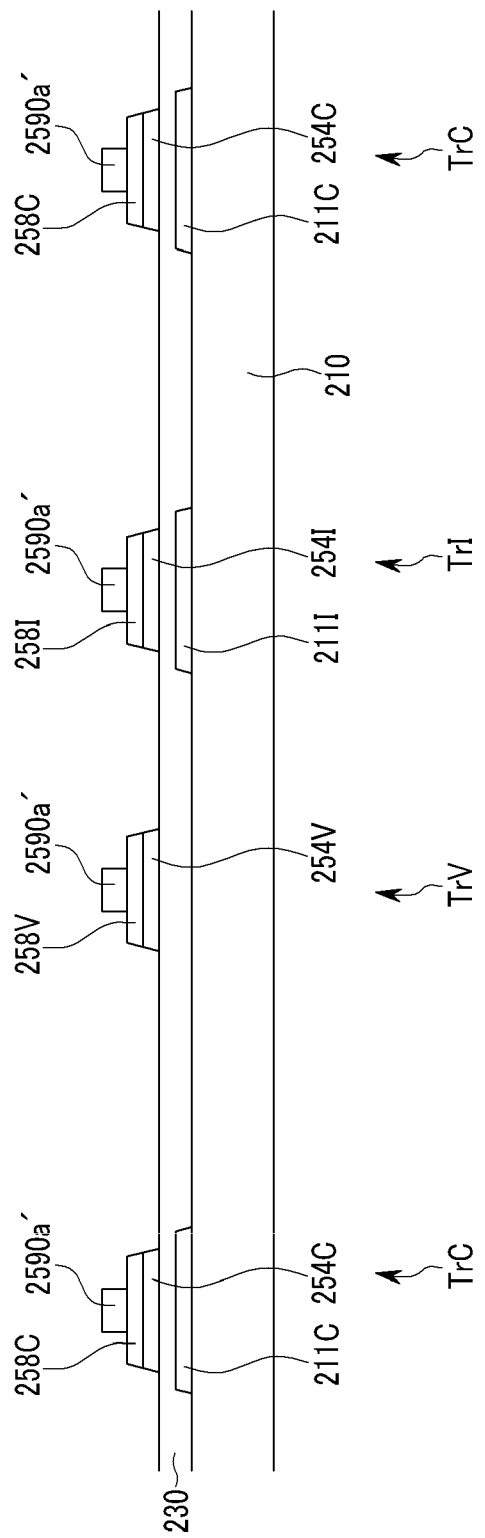

FIG. 15 and FIG. 16 are cross-sectional views showing different stages of manufacturing the liquid crystal display of FIG. 12, according to another exemplary embodiment. The manufacturing method of the liquid crystal display shown in FIG. 12 will be described with reference to FIGS. 12, 15, and 16.

The present exemplary embodiment is substantially the same as the exemplary embodiment of FIGS. 12, 13, and 14, with a primary difference being the manufacturing method of the channel passivation layer. In the interest of avoiding redundancy, descriptions provided above will not be repeated.

As shown in FIG. 15, a semiconductor material and a channel passivation layer material are sequentially formed on the blocking insulating layer 230. Next, a third photosensitive film pattern 2590 including a first portion 2590a and a second portion 2590b that is thinner than the first portion 2590a is formed on the channel passivation layer material. Here, the first portion 2590a corresponds to a portion where the channel passivation layer is formed, and the second portion 2590b corresponds to the circumference of the first portion 2590a. Also, the semiconductor material and the channel passivation layer material are etched by using the third photosensitive film pattern to form the semiconductor layers 254V, 254I, and 254C and a channel passivation layer pattern 2580.

Next, as shown in FIG. 16, the third photosensitive film pattern 2590 is etched to remove the second portion 2590b and the thickness of the first portion 2590a' is reduced. Accordingly, the channel passivation layer pattern under the second portion 2590b is exposed.

Next, as shown in FIG. 12, the exposed channel passivation layer pattern 2580 is etched by using the first portion 2590a' of the third photosensitive film pattern to form the channel passivation layers 258V, 258I, and 258C. Also, the first portion 2590a' of the third photosensitive film pattern is removed.

Figure 17:
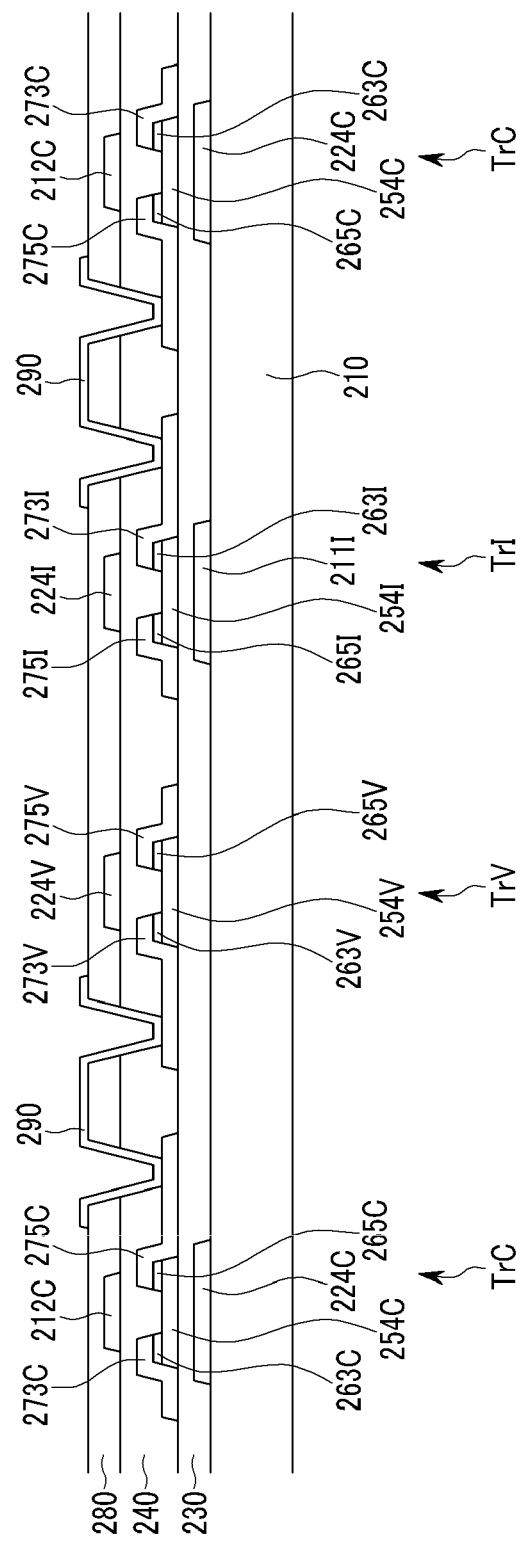
FIG. 17 is a cross-sectional view of a display device according to another exemplary embodiment of the present invention.

FIG. 17 is a cross-sectional view of a display device according to another exemplary embodiment of the present invention.

The present exemplary embodiment is substantially the same as the exemplary embodiment of FIG. 1 except for the readout transistor TrC. In the interest of avoiding redundancy, descriptions of elements already provided above will not be repeated.

As shown in FIG. 17, the readout transistor TrC may include a gate electrode 224C, a semiconductor layer 254C, ohmic contact layers 263C and 265C, a source electrode 273C, a drain electrode 275C, and a gate insulating layer 240.

The gate electrode 224C may be disposed on the upper substrate 210, and a blocking insulating layer 230 covering the gate electrode 224C may be formed on the upper substrate 210. A semiconductor layer 254C overlapping the gate electrode 224C may be formed on the blocking insulating layer 230. The ohmic contact layers 263C and 265C may be disposed on the semiconductor layer 254C. The source electrode 273C may be disposed on the ohmic contact layer 263C. The drain electrode 275C may be separated from the source electrode 273C on the ohmic contact layer 265C. The gate insulating layer 240 may be disposed on the semiconductor layer 254C, the source electrode 273C, and the drain electrode 275C.

As described above, the infrared sensing transistor TrI and the visible light sensing transistor TrV are formed with the top gate structure of the planar type and the readout transistor TrC is formed with the bottom gate structure such that the photosensitivity of the infrared sensing transistor TrI and the visible light sensing transistor TrV may be improved and the processing speed of the readout transistor TrC may be simultaneously improved, and thereby the semiconductor layer may be appropriate for the infrared ray sensing, the visible ray sensing, and the control.

Particularly, when the readout transistor is formed with the top gate structure, the channel is formed on the semiconductor layer such that the channel of the semiconductor layer may be easily damaged during the etching process of the ohmic contact layer. Hence, to improve channel characteristics, the readout transistor is formed with the bottom gate structure. In the readout transistor TrC, an assistance gate electrode 212C overlapping the semiconductor layer 254C may be formed on the gate insulating layer 240. The gate electrode 224C and the assistance gate electrode 212C are formed in the readout transistor TrC such that the channel is formed perpendicularly to the semiconductor layer, improving the processing speed of the transistor.

A passivation layer 280 for protecting the assistance gate electrode 212C may be formed on the assistance gate electrode 212C.

The infrared sensing transistor TrI and the visible light sensing transistor TrV have the top gate structure of the planar type. However, this is not a limitation of the invention and the infrared sensing transistor TrI and the visible light sensing transistor TrV may have the top gate structure of a stagger type.

Figure 18:
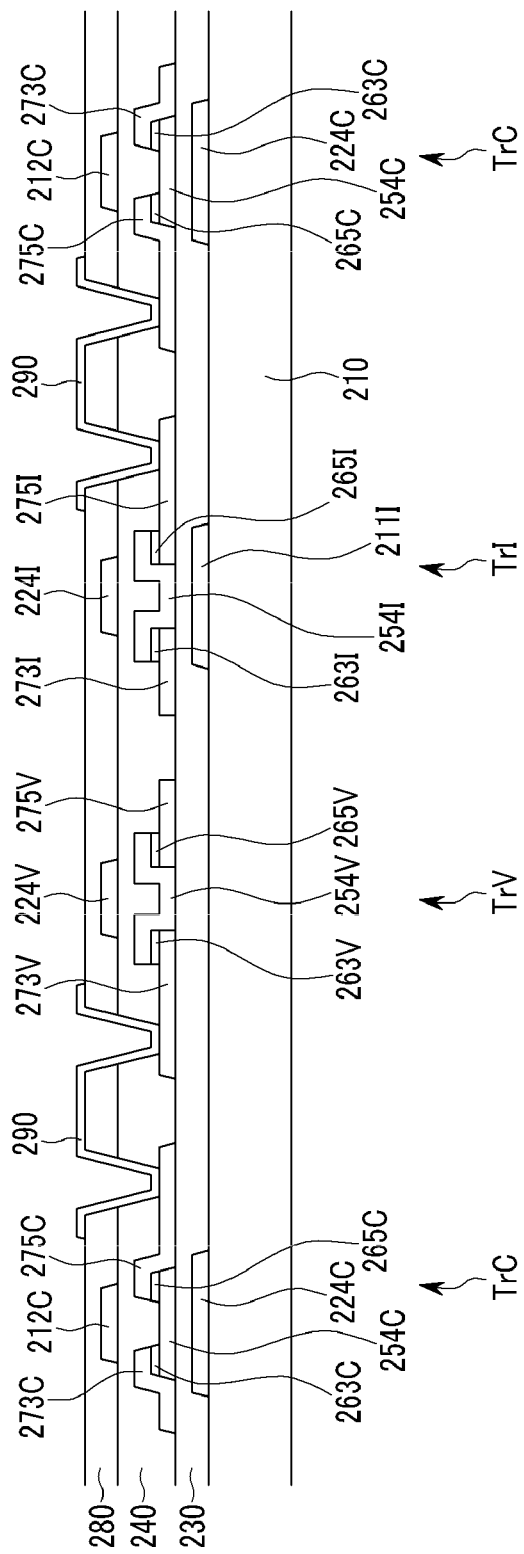
FIG. 18 is a cross-sectional view of a display device according to another exemplary embodiment of the present invention.

FIG. 18 is a cross-sectional view of a display device according to another exemplary embodiment of the present invention.

As shown in FIG. 18, in the top gate structure of the stagger type, source electrodes 273I and 273V and drain electrodes 275I and 275V are disposed on an upper substrate 210, semiconductor layers 254I and 254V are disposed between the source electrodes 273I and 273V and the drain electrode 275I and 275V, and gate electrodes 224I and 224V are formed on the semiconductor layers 254I and 254V. In the top gate structure of the stagger type, the region where the semiconductor layer is exposed is smaller than the top gate structure of the planar type such that the photosensitivity may be reduced. However, the processing speed may be improved.

Also, the infrared sensing transistor TrI and the visible light sensing transistor TrV may be formed with the inverted planar type of structure.

Figure 19:
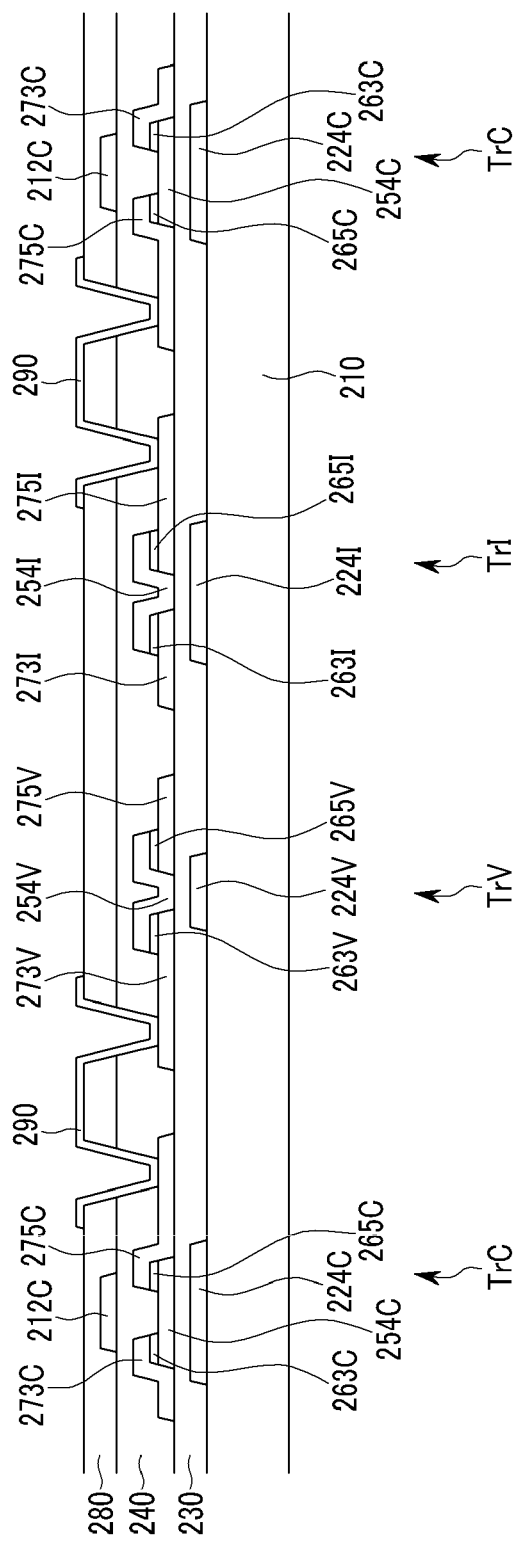
FIG. 19 is a cross-sectional view of a display device according to another exemplary embodiment of the present invention.

FIG. 19 is a cross-sectional view of a display device according to another exemplary embodiment of the present invention.

As shown in FIG. 19, in the inverted planar type of structure, gate electrodes 224I and 224V are disposed on an upper substrate 210, source electrodes 273I and 273V and drain electrodes 275I and 275V are formed on the gate electrodes 224I and 224V, semiconductor layers 254I and 254V are respectively disposed between the source electrodes 273I and 273V and the drain electrodes 275I and 275V, and the semiconductor layers 254I and 254V overlap the gate electrodes 224I and 224V.

Figure 20:
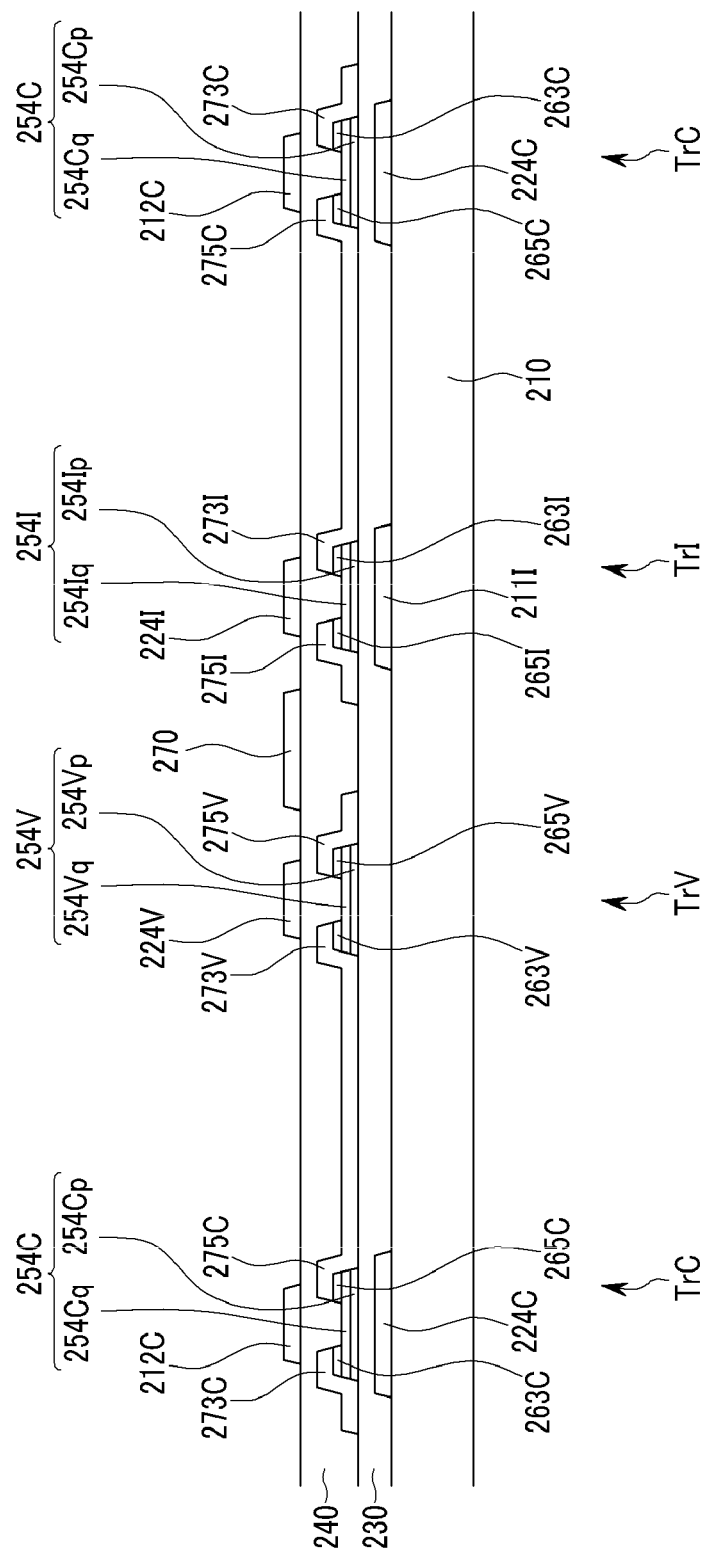
FIG. 20 is a cross-sectional view of a display device according to another exemplary embodiment of the present invention.

FIG. 20 is a cross-sectional view of a display device according to another exemplary embodiment of the present invention.

The present exemplary embodiment is substantially the same as the exemplary embodiment shown in FIG. 17, with differences including a structure of the semiconductor layer of the visible light sensing transistor TrV, a common electrode simultaneously formed with the gate electrode, a connection relationship of a readout transistor TrC and an infrared sensing transistor TrI, and a visible light sensing transistor TrV such that the overlapping descriptions are omitted.

As shown in FIG. 20, the semiconductor layers 254V, 254I, and 254C may include two layers of a lower layer (254Vp, 254Ip, 254Cp) of amorphous silicon and an upper layer (254Vq, 254Iq, 254Cq) of amorphous silicon-germanium or micro-crystalline silicon, or two layers of a lower layer (254Vp, 254Ip, 254Cp) of micro-crystalline silicon and an upper layer (254Vq, 254Iq, 254Cq) of amorphous silicon-germanium. Here, the upper layer 254Vq of the visible light sensing transistor TrV is disposed under the source electrode 273V and the drain electrode 275V, and a portion between the source electrode 273V and the drain electrode 275V is removed. Accordingly, the upper layer 254Vq that is made of amorphous silicon-germanium or micro-crystalline silicon generating the current due to its sensitivity to infrared rays is not exposed to the visible rays and the infrared rays. Hence, no current is caused by the infrared rays and a current is only partly generated by the visible rays in the visible light sensing transistor TrV, thereby improving the photosensitivity.

The readout transistor TrC is connected to the source electrode 273I of the infrared sensing transistor TrI through the drain electrode 275C, and the readout transistor TrC is connected to the source electrode 273V of the visible light sensing transistor TrV through the drain electrode 275C.

The common electrode 270 is the same layer as the gate electrodes 224I and 224V of the infrared sensing transistor TrI and the visible light sensing transistor TrV. That is, the gate electrodes 224I and 224V and the common electrode 270 are formed on the gate insulating layer 240. Accordingly, a manufacturing process to form the common electrode 270 is not required, and the manufacturing process may be simplified.

Figure 21:
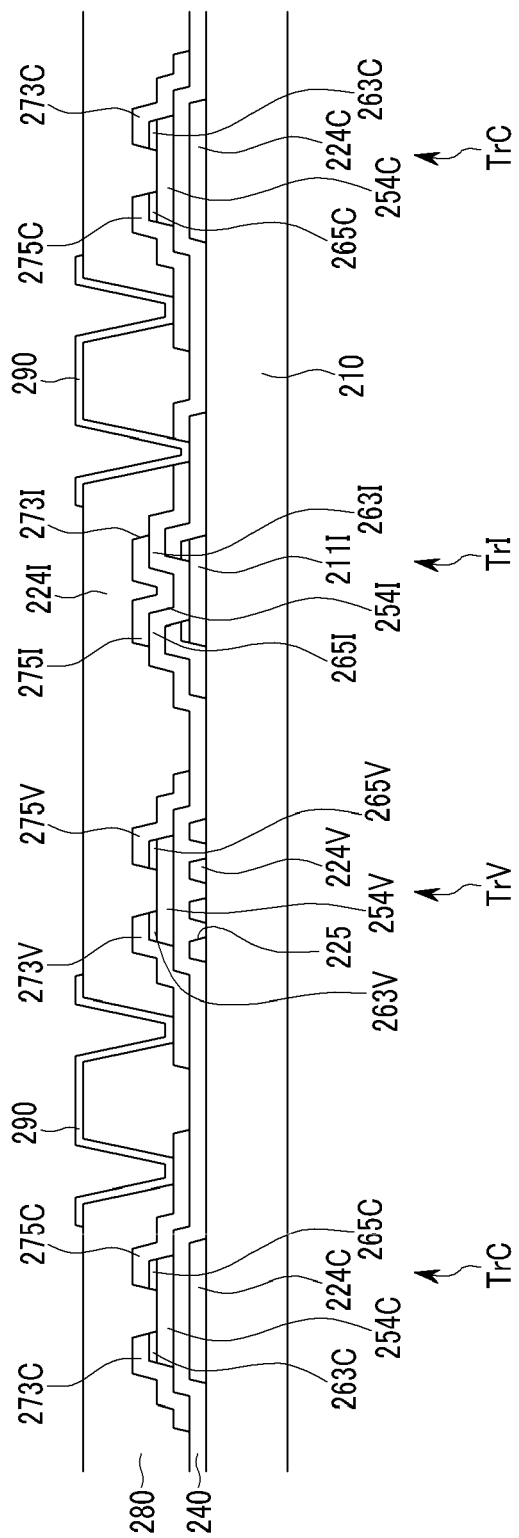
FIG. 21 is a cross-sectional view of a display device according to another exemplary embodiment of the present invention.

FIG. 21 is a cross-sectional view of a display device according to another exemplary embodiment of the present invention.

In FIG. 21, the infrared sensing transistor TrI is formed with the top gate structure, and the visible light sensing transistor TrV and the readout transistor TrC are formed with the bottom gate structure.

As shown in FIG. 21, the readout transistor TrC may include a gate electrode 224C, a gate insulating layer 240, a semiconductor layer 254C, ohmic contact layers 263C and 265C, a source electrode 273C, and a drain electrode 275C.

The gate electrode 224C may be disposed on the upper substrate 210, and the gate insulating layer 240 covering the gate electrode 224C may be formed on the upper substrate 210. The semiconductor layer 254C overlapping the gate electrode 224C may be formed on the gate insulating layer 240. The semiconductor layer 254C may be made of amorphous silicon. The ohmic contact layers 263C and 265C may be disposed on the semiconductor layer 254C. The source electrode 273C may be disposed on the ohmic contact layer 263C. The drain electrode 275C may be separated from the source electrode 273C on the ohmic contact layer 265C. The passivation layer 280 may be disposed on the semiconductor layer 254C, the source electrode 273C, and the drain electrode 275C.

The readout transistor TrC may be connected to the visible light sensing transistor TrV through the connecting member 290 formed on the passivation layer 280, and the readout transistor TrC may be connected to the visible light sensing transistor TrV through the drain electrode 275C.

The visible light sensing transistor TrV may include a gate electrode 224V, a gate insulating layer 240, a semiconductor layer 254V, ohmic contact layers 263V and 265V, a source electrode 273V, and a drain electrode 275V.

The gate electrode 224V may be disposed on the upper substrate 210, and the gate electrode 224V has a plurality of openings 225. The visible rays may flow into the semiconductor layer 254V through the openings 225 such that the visible light sensing transistor TrV may be formed with the bottom gate structure.

The gate insulating layer 240 may cover the gate electrode 224V. The semiconductor layer 254V may overlap the gate electrode 224V on the gate insulating layer 240. The semiconductor layer 254V may be made of amorphous silicon, and ohmic contact layers 263V and 265V may be positioned on the semiconductor layer 254V. The source electrode 273V may be positioned on the ohmic contact layer 263V. The drain electrode 275V may be separated from the source electrode 273V on the ohmic contact layer 265V. A passivation layer 280 may be disposed on the semiconductor layer 254V, the source electrode 273V, and the drain electrode 275V.

The readout transistor TrC may be connected to the infrared sensing transistor TrI through the connecting member 290 formed on the passivation layer 280, and the readout transistor TrC may be connected to the infrared sensing transistor TrI through the drain electrode 275C.

The infrared sensing transistor TrI may include a semiconductor layer 254I, ohmic contact layers 263I and 265I, a source electrode 273I, a drain electrode 275I, a gate insulating layer 240, and a gate electrode 224I.

The semiconductor layer 254I may be disposed on the upper substrate 210, and may be made of amorphous silicon-germanium or micro-crystalline silicon. Also, the semiconductor layer 254I may include two layers including a lower layer of amorphous silicon and an upper layer of amorphous silicon-germanium or micro-crystalline silicon, or two layers including a lower layer of micro-crystalline silicon and an upper layer of amorphous silicon-germanium.

The ohmic contact layers 263I and 265I may be disposed on the semiconductor layer 254I. The source electrode 273I may be disposed on the ohmic contact layer 263I. The drain electrode 275I may be separated from the source electrode 273I on the ohmic contact layer 265I. The gate insulating layer 240 covers the semiconductor layer 254I, the source electrode 273I, and the drain electrode 275I. The gate electrode 224I may overlap the semiconductor layer 254I on the gate insulating layer 140. A passivation layer 280 for protecting the gate electrode 224I may be formed on the gate electrode 224I. Here, the gate electrodes 224C and 224V, the source electrode 273I, and the drain electrode 275I may be made of the same conductor, and the gate electrode 224I, the source electrodes 273C and 273V, and the drain electrodes 275C and 275V may be made of the same conductor.

As described above, the infrared sensing transistor TrI is made with the top gate structure and the semiconductor layer is made of amorphous silicon-germanium such that the sensitivity to the infrared rays may be improved, the visible light sensing transistor TrV is formed with the bottom gate structure including the gate electrode having the opening and the semiconductor layer is made of amorphous silicon such that the transistor characteristics and the sensitivity to the visible rays may be improved, and the readout transistor TrC is made with the bottom gate structure and the semiconductor layer is made of amorphous silicon such that the transistor characteristics may be improved. Accordingly, the transistor may be formed to be appropriate for the objects of the infrared sensing transistor, the visible light sensing transistor, and the readout transistor.

Figure 22:
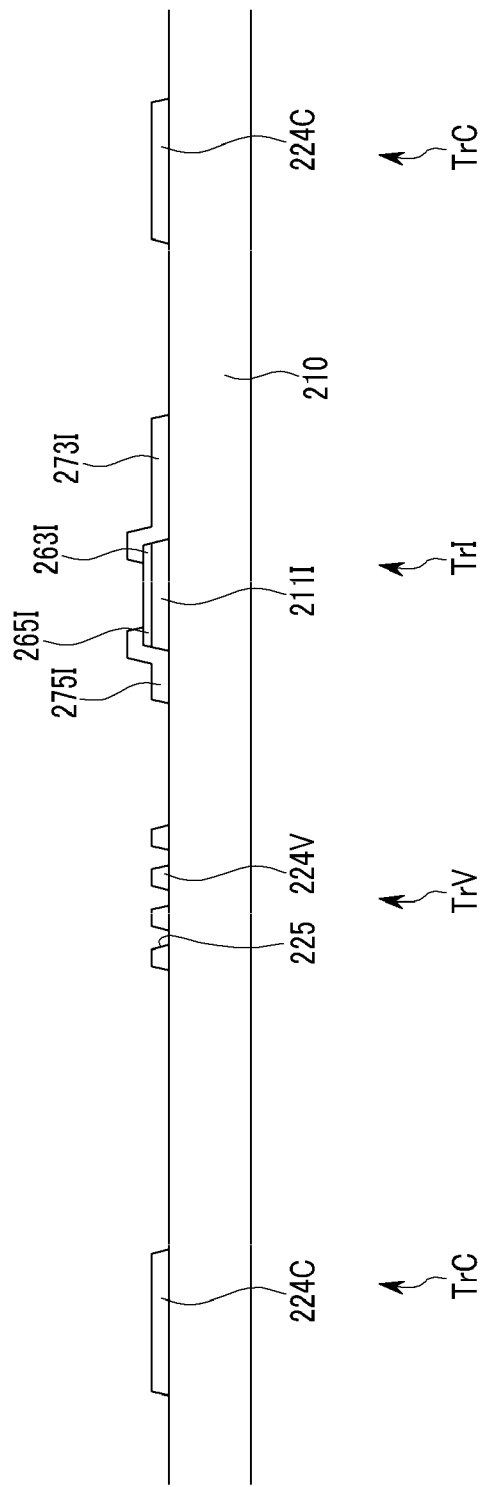
FIG. 22 and FIG. 23 are cross-sectional views showing different stages of manufacturing the liquid crystal display of FIG. 21.
Figure 23:
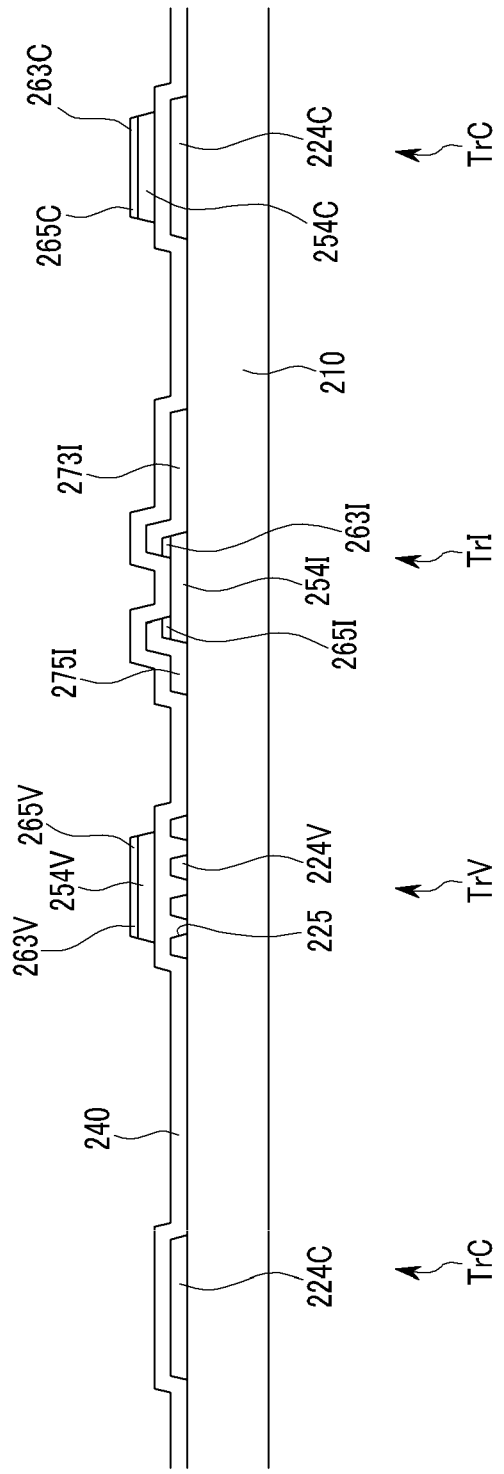

FIG. 22 and FIG. 23 are cross-sectional views showing a manufacturing method of a liquid crystal display of FIG. 21 in sequence. The manufacturing method of the liquid crystal display shown in FIG. 21 will be described with reference to FIGS. 21, 22, and 23.

Firstly, as shown in FIG. 22, a semiconductor layer 254I and an ohmic contact material of the infrared sensing transistor are formed on the substrate 210. Next, gate electrodes 224C and 224V are formed on the substrate 210, and simultaneously a source electrode 273I and a drain electrode 275I made of the same conductive layer are formed on the substrate 210 and the ohmic contact material. Then, the exposed portion of the ohmic contact material is removed (e.g., etched) by using the source electrode 273I and the drain electrode 275I (e.g., as a etching preventing layer) to form the ohmic contact layers 263I and 265I.

As shown in FIG. 23, a gate insulating layer 240 covering the gate electrodes 224C and 224V, the source electrode 273I, and the drain electrode 275I is then formed. Next, the semiconductor layers 254C and 254V and the ohmic contact material are formed on the position overlapping the gate electrodes 224C and 224V among the gate insulating layer 240.

Next, as shown in FIG. 21, a gate electrode 224I is formed on the position overlapping the semiconductor layer 254I among the gate insulating layer 240, and source electrodes 273C and 273V and drain electrodes 275C and 275V are formed on the gate insulating layer 240, the semiconductor layers 254C and 254V, and the ohmic contact material. The gate electrode 224I, the source electrodes 273C and 273V, and the drain electrodes 275C and 275V may be simultaneously formed with the same conductive layer.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display panel comprising:
   a panel including a substrate,
   a sensing transistor disposed on the substrate, and
   a readout transistor connected to the sensing transistor and transmitting a detecting signal,
   wherein the sensing transistor includes a semiconductor layer disposed on the substrate, a source electrode and a drain electrode disposed on the semiconductor layer, and a gate electrode overlapping the semiconductor layer on the source electrode and the drain electrode.

2. The display device of claim 1, wherein the semiconductor layer of the sensing transistor includes at least one selected from amorphous silicon, amorphous silicon-germanium, and micro-crystalline silicon.

3. The display device of claim 2, wherein the semiconductor layer is made of a single layer of amorphous silicon-germanium.

4. The display device of claim 2, wherein
   the semiconductor layer includes a lower layer of amorphous silicon and an upper layer of amorphous silicon-germanium.

5. The display device of claim 4, wherein
   the thickness of the lower layer is more than 200 Å, and the thickness of the upper layer is more than 1500 Å.

6. The display device of claim 1, further comprising a channel passivation layer disposed on the semiconductor layer of the sensing transistor.

7. The display device of claim 1, wherein
the sensing transistor includes an infrared sensing transistor, and a light blocking film is disposed between the substrate and the semiconductor layer of the infrared sensing transistor.

8. The display device of claim 7, wherein
the light blocking film is applied with a predetermined voltage.

9. A display device comprising:
a lower panel including a lower substrate and a pixel transistor disposed on the lower substrate; and
an upper panel facing the lower panel, and including an upper substrate, an infrared sensing transistor, a visible light sensing transistor, and a readout transistor,
wherein the infrared sensing transistor includes a first semiconductor layer disposed on the upper substrate, a first source electrode and a first drain electrode disposed on the first semiconductor layer, and a first gate electrode overlapping the first semiconductor layer on the first source electrode and the first drain electrode, and
the readout transistor is connected to the visible light sensing transistor and the infrared sensing transistor, thereby transmitting a detecting signal.

10. The display device of claim 9, wherein
the visible light sensing transistor includes a second semiconductor layer disposed on the upper substrate, a second source electrode and a second drain electrode disposed on the second semiconductor layer, and a second gate electrode overlapping the second semiconductor layer on the second source electrode and the second drain electrode.

11. The display device of claim 10, wherein
the second semiconductor layer includes a lower layer of amorphous silicon and an upper layer of amorphous silicon-germanium, and
a portion of the upper layer of the second semiconductor layer is removed between the second source electrode and the second drain electrode.

12. The display device of claim 11, further comprising
a channel passivation layer disposed on the first semiconductor layer and the second semiconductor layer.

13. The display device of claim 9, wherein
the visible light sensing transistor includes a second gate electrode disposed on the upper substrate, a second semiconductor layer overlapping the second gate electrode on the second gate electrode, and a second source electrode and a second drain electrode on the second semiconductor layer.

14. The display device of claim 13, wherein
the second gate electrode has a plurality of openings.

15. The display device of claim 13, wherein
the second semiconductor layer includes a lower layer of amorphous silicon and an upper layer of amorphous silicon-germanium, and
a portion of the upper layer of the second semiconductor layer is removed between the second source electrode and the second drain electrode.

16. The display device of claim 15, further comprising
a channel passivation layer disposed on the first semiconductor layer and the second semiconductor layer.

17. The display device of claim 9, wherein
the visible light sensing transistor includes a second source electrode and a second drain electrode disposed on the upper substrate, a second semiconductor layer disposed between the second source electrode and the second drain electrode, and a second gate electrode overlapping the second semiconductor layer on the second semiconductor layer.

18. The display device of claim 17, wherein
the second semiconductor layer includes a lower layer of amorphous silicon and an upper layer of amorphous silicon-germanium, and
a portion of the upper layer of the second semiconductor layer is removed between the second source electrode and the second drain electrode.

19. The display device of claim 18, further comprising
a channel passivation layer disposed on the first semiconductor layer and the second semiconductor layer.

20. The display device of claim 19, wherein
the second gate electrode has a plurality of openings.

21. The display device of claim 20, wherein
the second semiconductor layer includes a lower layer of amorphous silicon and an upper layer of amorphous silicon-germanium, and
a portion of the upper layer of the second semiconductor layer is removed between the second source electrode and the second drain electrode.

22. The display device of claim 21, further comprising
a channel passivation layer disposed on the first semiconductor layer and the second semiconductor layer.

23. The display device of claim 9, wherein
the visible light sensing transistor includes a second gate electrode disposed on the upper substrate, a second source electrode and a second drain electrode disposed on the second gate electrode, and a second semiconductor layer overlapping the second gate electrode on the second source electrode and the second drain electrode.

24. The display device of claim 9, wherein
the readout transistor includes a second semiconductor layer disposed on the upper substrate, a second source electrode and a second drain electrode disposed on the second semiconductor layer, and a second gate electrode overlapping the second semiconductor layer on the second source electrode and the third drain electrode.

25. The display device of claim 24, further comprising
a light blocking film disposed between the upper substrate and the third semiconductor layer.

26. The display device of claim 9, wherein
the readout transistor includes a second gate electrode disposed on the upper substrate, a second semiconductor layer disposed on the second gate electrode and overlapping the second gate electrode, and a second source electrode and a second drain electrode disposed on the second semiconductor layer.

27. The display device of claim 26, further comprising
a light blocking film disposed on the second source electrode and the second drain electrode, and overlapping the second semiconductor layer.

28. The display device of claim 9, wherein
the readout transistor includes a second source electrode and a second drain electrode disposed on the upper substrate, a second semiconductor layer disposed between the second source electrode and the second drain electrode, and a second gate electrode disposed on the second semiconductor layer and overlapping the second semiconductor layer.

29. The display device of claim 28, further comprising
a light blocking film disposed between the upper substrate and the second semiconductor layer.

30. The display device of claim 9, wherein
the readout transistor includes a second gate electrode disposed on the upper substrate, a second source electrode and a second drain electrode disposed on the second gate electrode, and a second semiconductor layer disposed on the second source electrode and the second drain electrode and overlapping the second gate electrode.

31. The display device of claim 30, further comprising
a light blocking film disposed on the second semiconductor layer, and overlapping the second semiconductor layer.

* * * * *